United States Patent [19]

Auinger

[11] 4,144,470
[45] Mar. 13, 1979

[54] POLE CHANGEABLE THREE PHASE WINDING

[75] Inventor: Herbert Auinger, Nüremberg, Fed. Rep. of Germany

[73] Assignee: Siemens Aktiengesellschaft, Munich, Fed. Rep. of Germany

[21] Appl. No.: 811,992

[22] Filed: Jun. 30, 1977

[30] Foreign Application Priority Data

Jul. 1, 1976 [DE] Fed. Rep. of Germany ....... 2629642

[51] Int. Cl.$^2$ ............................................. H02K 3/00
[52] U.S. Cl. .................................... 310/198; 318/773
[58] Field of Search ...................... 318/224 R, 225 R; 310/198–200, 202, 203, 206, 207, 208, 184

[56] References Cited

U.S. PATENT DOCUMENTS

| | | | |
|---|---|---|---|
| 3,794,870 | 2/1974 | Broadway et al. | 310/208 X |
| 3,927,358 | 12/1975 | Broadway et al. | 318/224 R |
| 3,949,253 | 4/1976 | Broadway et al. | 310/184 |
| 4,013,909 | 3/1977 | Broadway et al. | 318/224 R X |
| 4,075,543 | 2/1978 | Uyen | 318/224 R |

*Primary Examiner*—Gene Z. Rubinson
*Attorney, Agent, or Firm*—Kenyon & Kenyon, Reilly, Carr & Chapin

[57] ABSTRACT

A pole changeable three phase winding for a fractional pole pair ratio $p_1:p_2 = (3m \pm 1)/3n$ with $p_2 = 3n$ being an integral multiple of the number of phases and m and n being positive integers.

Each phase winding for the first number of poles $2p_1$ consists of $2p_1/t$ equal winding branches, of which a number G, divisible by three, of so-called base winding-branches carry current for the first number of poles $2p_1$ and for the second number of poles $2p_2$, where one third of each of the base winding branches, for the second number of poles $2p_2$, are assigned to all three phase windings. The remaining number N of winding branches are designed as zero branches which are ineffective for the second number of poles $2p_2$, so that a division into G base winding branches and N zero branches according to $G + N = 2p_1/t$ takes place, where t is an integral divisor of $2p_1$.

39 Claims, 60 Drawing Figures

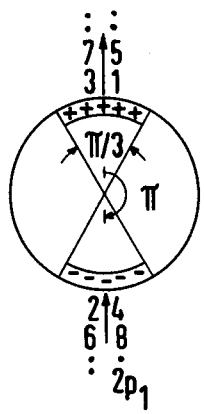
Fig.1
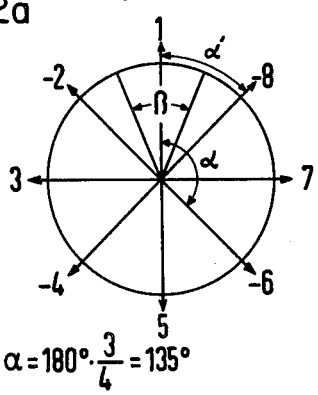
Fig.2a  8/6-POLE
$\alpha = 180° \cdot \frac{3}{4} = 135°$
$\beta = 60° \cdot \frac{3}{4} = 45°$
$\alpha' = 45°, \; \beta : \alpha' = 1$
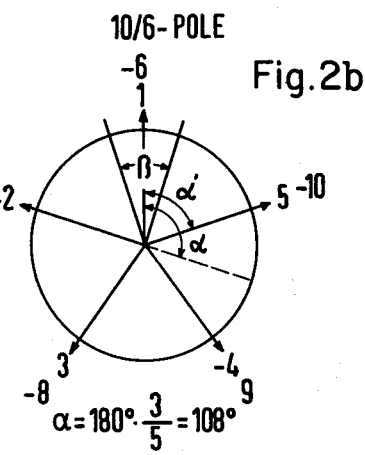
Fig.2b  10/6-POLE
$\alpha = 180° \cdot \frac{3}{5} = 108°$
$\beta = 60° \cdot \frac{3}{5} = 36°$
$\alpha' = 72°, \; \beta : \alpha' = 0,5$
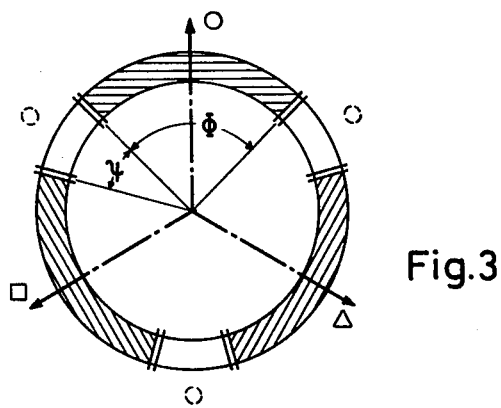
Fig.3

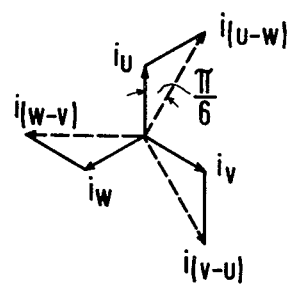
Fig. 10a
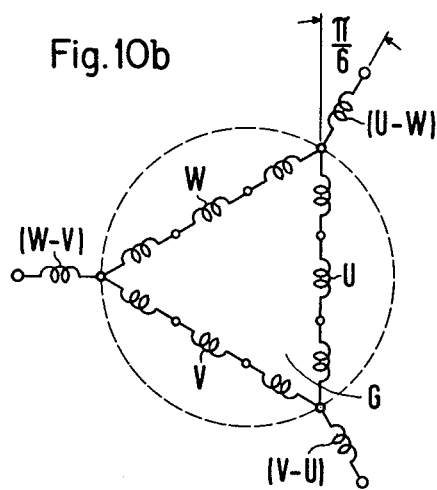
Fig. 10b
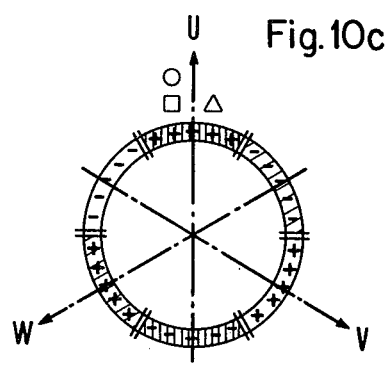
Fig. 10c
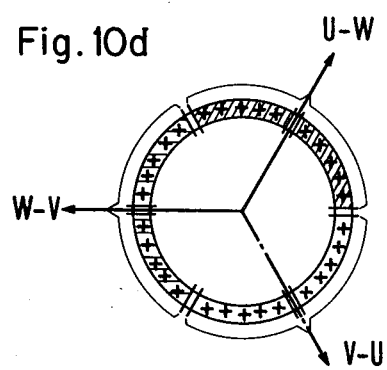
Fig. 10d
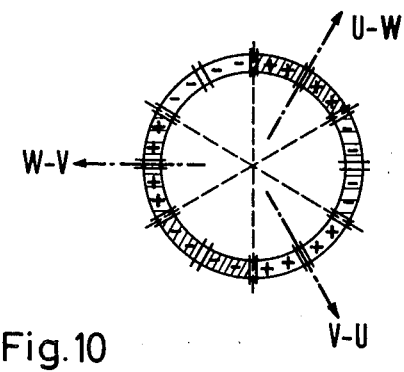
Fig. 10e
Fig. 10

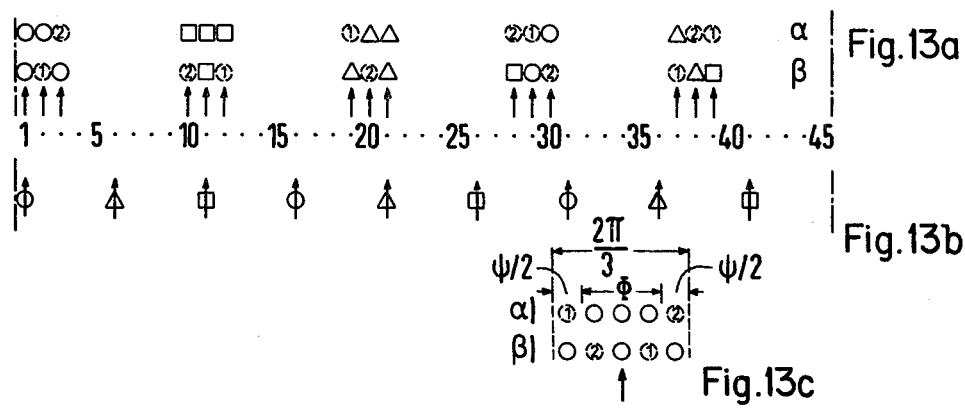
Fig.13a
Fig.13b
Fig.13c
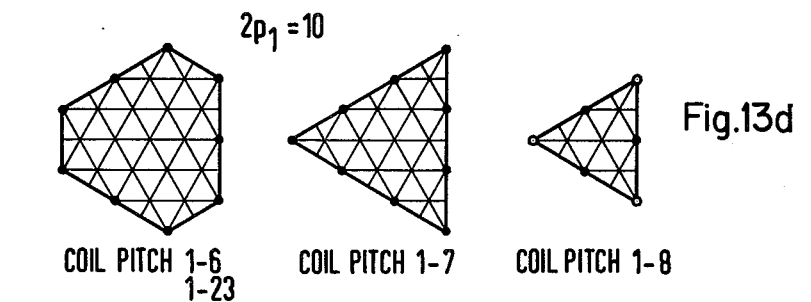
Fig.13d
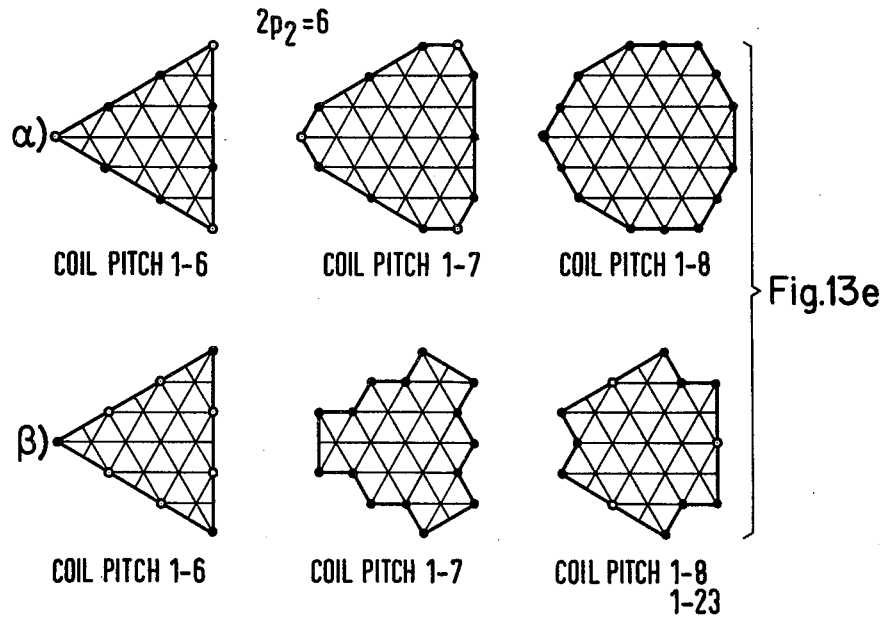
Fig.13e

COIL PITCH 1-10  $\xi_{10} = 0.844$
COIL PITCH 1-11  $\xi_{10} = 0.831$
COIL PITCH 1-12  $\xi_{10} = 0.793$

COIL PITCH 1-10  $\xi_6 = 0.762$
COIL PITCH 1-11  $\xi_6 = 0.816$
COIL PITCH 1-12  $\xi_6 = 0.861$

COIL PITCH 1-8
$\xi_6 = 0{,}547$

COIL PITCH 1-9
$\xi_6 = 0{,}608$

COIL PITCH 1-10
$\xi_6 = 0{,}662$

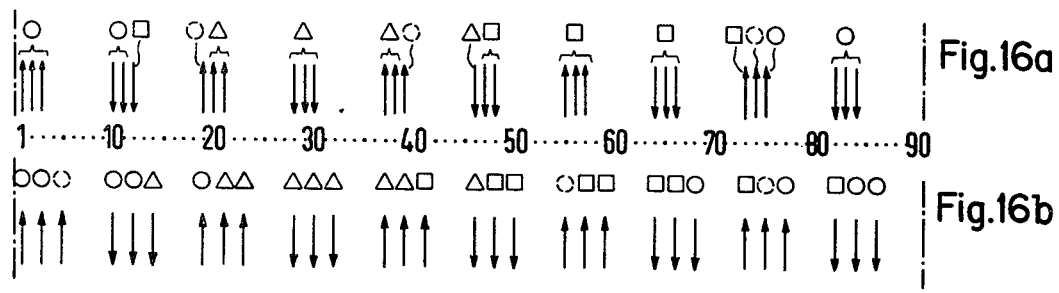
Fig.16a
Fig.16b
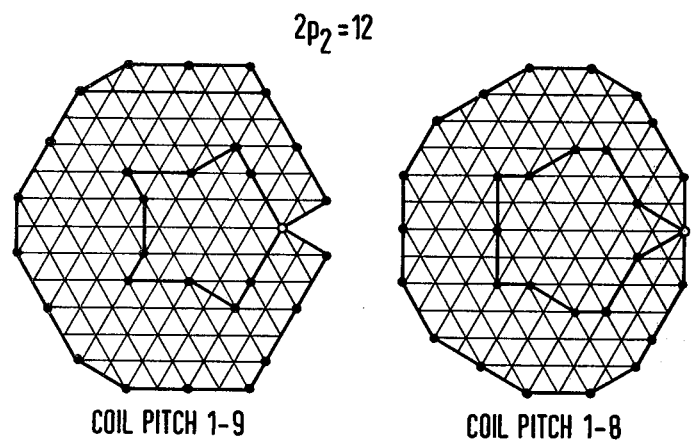
$2p_2 = 12$
COIL PITCH 1-9  COIL PITCH 1-8
Fig.16c
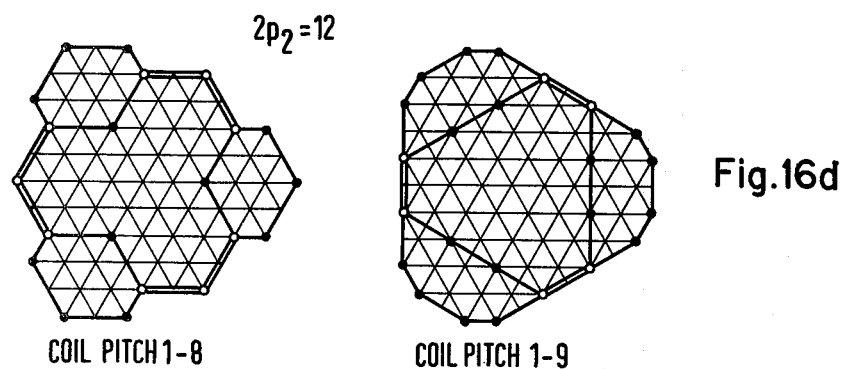
$2p_2 = 12$
COIL PITCH 1-8  COIL PITCH 1-9
Fig.16d

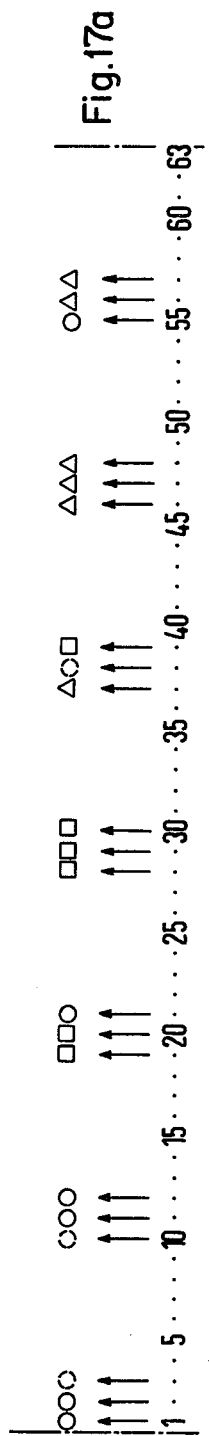
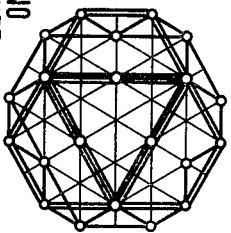
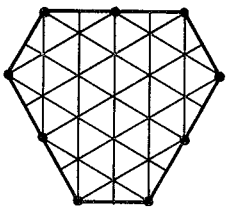
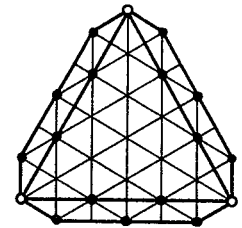
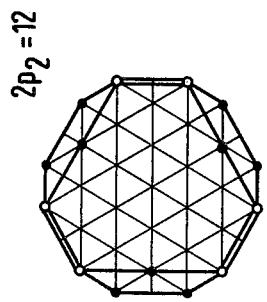
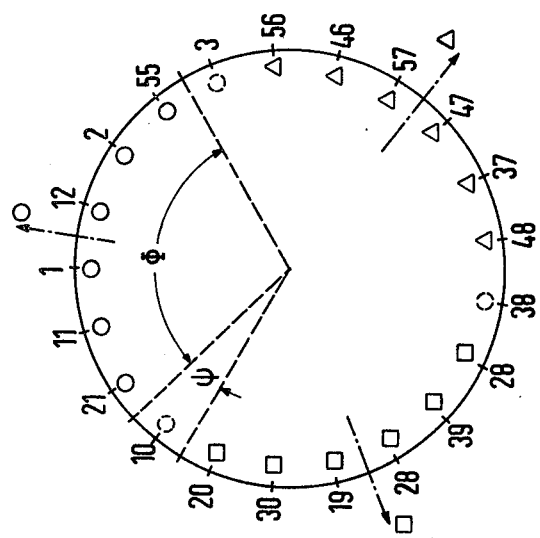
Fig. 17a
Fig. 17b
Fig. 17c
Fig. 17d

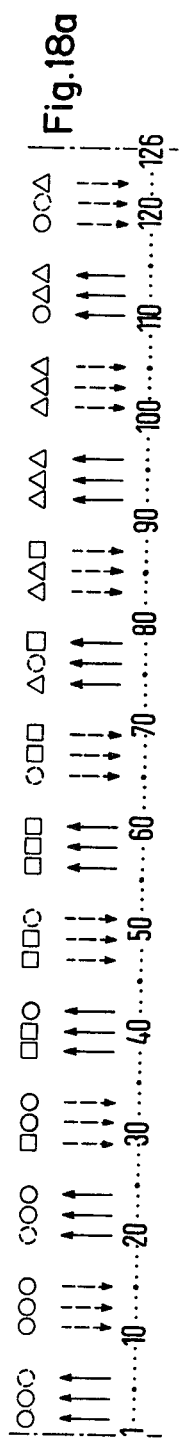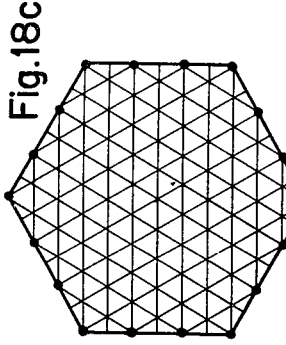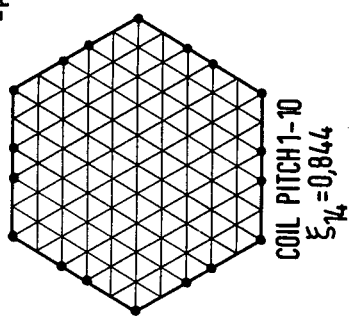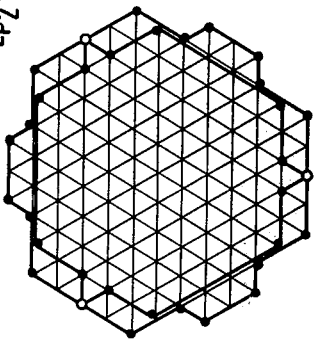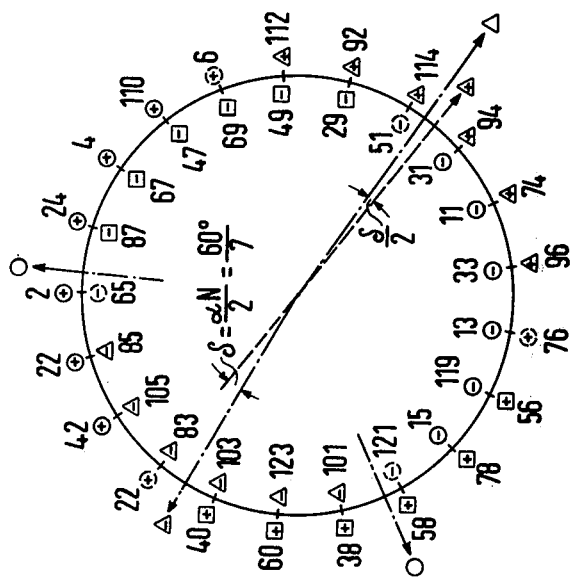

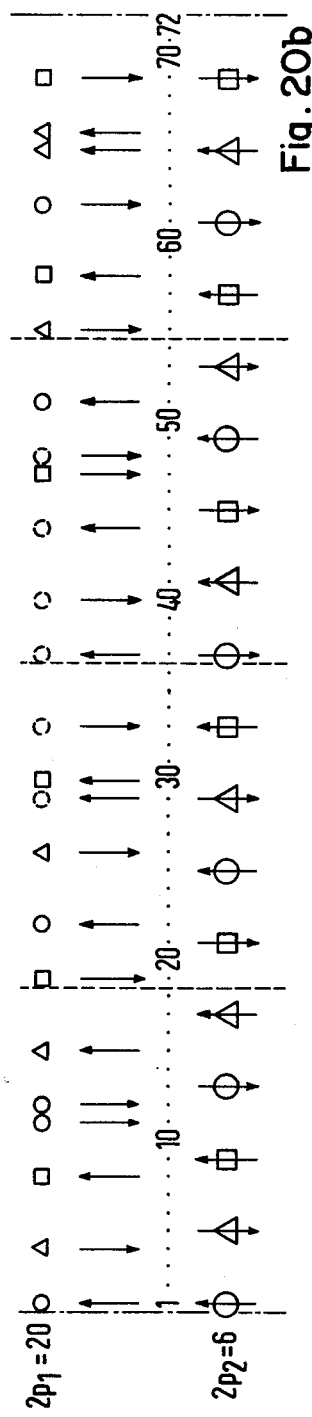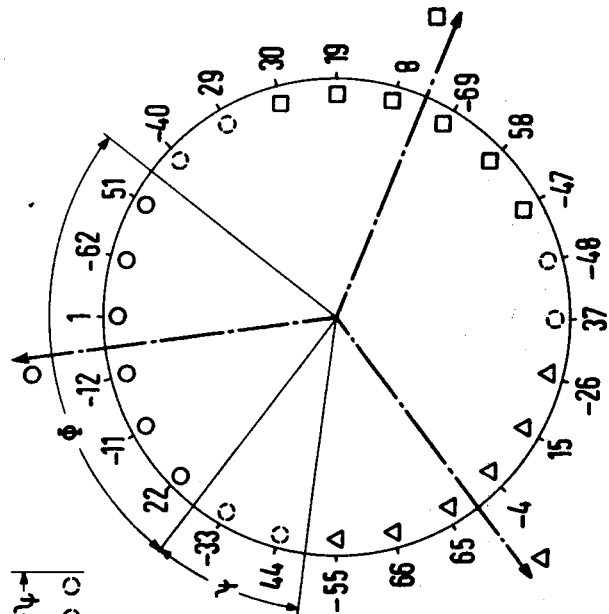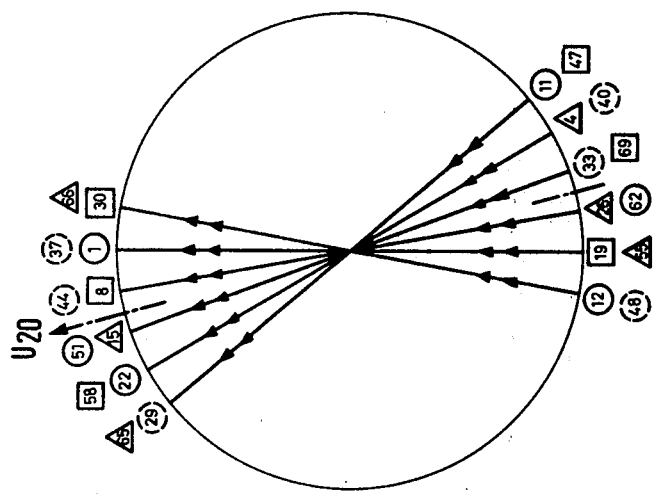

TRIAXIALLY SYMMETRICAL

TRIAXIALLY PERIODIC

Table I

Possible subdivisions into G base winding and N zero branches, respectively

The underlined values for G + N can be realized only with $\pi/3$ spreaded phaseband windings $$p_1 = 3m \pm 1$$

(prime numbers are designated with *)

special cases G : N = 3 : 1 in parenthese ()

| m | $2p_1$ | G + N | G + N | G + N | G + N | G + N |
|---|---|---|---|---|---|---|
| 1 | 4 | (3 + 1) | | | | |
|   | 8 | (6 + 2) | | | | |
| 2 | 10* | <u>9 + 1</u> | 6 + 4 | | | |
|   | 14* | 12 + 2 | <u>9 + 5</u> | | | |
| 3 | 16 | 15 + 1 | (12 + 4) | | | |
|   | 20 | 18 + 2 | (15 + 5) | | | |
| 4 | 22* | <u>21 + 1</u> | 18 + 4 | <u>15 + 7</u> | | |
|   | 26* | 24 + 2 | <u>21 + 5</u> | 18 + 8 | | |
| 5 | 28 | 27 + 1 | 24 + 4 | (21 + 7) | | |
|   | 32 | 30 + 2 | 27 + 5 | (24 + 8) | | |
| 6 | 34* | <u>33 + 1</u> | 30 + 4 | <u>27 + 7</u> | 24 + 10 | |
|   | 38* | 36 + 2 | <u>33 + 5</u> | 30 + 8 | <u>27 + 11</u> | |
| 7 | 40 | 39 + 1 | 36 + 4 | 33 + 7 | (30 + 10) | |
|   | 44 | 42 + 2 | 39 + 5 | 36 + 8 | (33 + 11) | |
| 8 | 46* | <u>45 + 1</u> | 42 + 4 | <u>39 + 7</u> | 36 + 10 | <u>33 + 13</u> |
|   | 50 | 48 + 2 | <u>45 + 5</u> | 42 + 8 | <u>39 + 11</u> | 36 + 14 |
| 9 | 52 | 51 + 1 | 48 + 4 | 45 + 7 | 42 + 10 | (39 + 13) |
|   | 56 | 54 + 2 | 51 + 5 | 48 + 8 | 45 + 11 | (42 + 14) |

Table II

| Number of parallel branches for large number of poles | Base winding circuit | | | Number of terminals for zero branches for small number of poles |
|---|---|---|---|---|
| 6 | triple Y | 1:1 | triple Δ | 6 |
| 9 | triple Δ | 3:1 | triple Δ | 11 |
| 10 | triple Y | $3\sqrt{3}$:1 | triple Δ | 12 |

Turns ratio high-pole/low-pole

Table III

| $\dfrac{p_1}{p_2}$ | Necessary $2\pi/3$ phase band coverage for $p_1$ = odd | Realizable with phase band spread $\pi/3$ and phase interspersing to twice the coverage $2\pi/3$ | phase band spread $2\pi/3$ not interspersing |
|---|---|---|---|
| $\dfrac{odd}{odd}$ | in all cases | for integral or fractional slot numbers $q_1 = \dfrac{Z}{p*}$ | for half- and fractional slot numbers $q_1 = \dfrac{Z}{2p*}$ |
| $\dfrac{odd}{even}$ | only for half- or fractional slot numbers $q_1 = \dfrac{Z}{2p*}$ | no | yes |
| p* is prime number divisor >3 of the first pole pair number $p_1$ | | | |

Table IV — Realizable Pole Pair Numbers Ratios, 1. Part

| | p₂ \ p₁ | 2* | 3* | 4 | 5* | 6 | 7* | 8 | 9 | 10 | 11* | 12 | 13* | 14 | 15 | 16 | 17* | 18 | 19* | 20 | 21 | 22 | 23* | 24 | 25 | 26 |
|---|---|---|---|---|---|---|---|---|---|---|---|---|---|---|---|---|---|---|---|---|---|---|---|---|---|---|
| 1 | 3 | I | = | I | II | – | II | I | – | 2x 5:3 | I | – | I | 2x 7:3 | – | 2x 8:3 | I | – | II | I | 3x 7:3 | I | II | 3x 8:3 | II | I |
| 2 | 6 | – | – | 2x 2:3 | I | = | I | 2x 4:3 | 3x 3:3 | 2x 5:6 | II | 3x 4:3 | II | I | 3x 5:3 | I | II | – | I | 4x 5:3 | – | 2x 11:6 | I | 3x 8:3 | I | 2x 13:6 |
| 2 | 9 | – | – | I | II | 3x 2:3 | II | I | = | I | I | = | I | 2x 7:6 | – | I | I | – | II | 5x 4:3 | – | I | II | – | I | I |
| 3 | 12 | | – | I | I | – | I | 4x 2:3 | 3x 4:3 | 2x 5:6 | I | = | II | 2x 7:6 | – | 4x 4:3 | II | 6x 3:2 | I | 5x 4:3 | 3x 7:9 | 2x 11:9 | I | 6x 4:3 | I | 2x 13:9 |
| 3 | 15 | | – | – | II | – | II | I | 3x 3:5 | 5x 2:3 | II | – | I | I | = | I | I | 3x 6:5 | II | 2x 10:9 | – | I | I | – | 5x 5:3 | I |
| 3 | 18 | | | | I | – | I | 2x 4:9 | – | 2x 5:9 | I | 6x 2:3 | II | 2x 7:9 | – | I | II | = | II | I | 3x 7:6 | 2x 11:9 | II | 3x 8:7 | I | 2x 13:9 |
| 4 | 21 | | | | | | I | I | 3x 3:7 | I | II | – | I | I | – | I | I | 3x 6:7 | I | 4x 5:6 | = | I | I | – | I | I |
| 4 | 24 | | | | | | – | – | 3x 3:8 | 2x 5:12 | I | 3x 4:9 | II | 2x 7:12 | – | 8x 2:3 | II | 6x 3:4 | II | 4x 5:6 | – | 2x 11:12 | II | 3x 8:9 | I | 2x 13:12 |
| 5 | 27 | | | | | | | | – | I | I | – | I | I | 3x 5:9 | I | I | 9x 2:3 | I | 10x 2:3 | 3x 7:9 | I | I | – | II | I |
| 5 | 30 | | | | | | | | | | II | – | II | 2x 7:15 | – | I | II | 6x 3:5 | II | I | – | 2x 11:15 | II | – | 5x 5:6 | I |
| 5 | 33 | | | | | | | | | | – | – | I | I | – | I | I | 3x 11:6 | II | I | – | 11x 2:3 | I | – | II | I |
| 6 | 36 | | | | | | | | | | | | I | 2x 7:18 | 3x 5:12 4x:9 | 4x 4:9 | I | – | I | 4x 5:9 | 3x 7:12 | 2x 11:12 | I | 12x 2:3 | I | 2x 13:18 |

Legend:
- I — π/3 phaseband realizable
- II — Pole pair number ratio: even/odd
- Pole pair number ratio: even or odd / even
- Pole pair number ratio: odd/odd — phaseband coverage of 2π/3 required

Table IV - 2. Part

| $p_1$ | 27 | 28 | 29* | 30 | 31* | 32 | 33 | 34 | 35 | 36 | 37* | 38 | 39 | 40 | 41+42 | 43* | 44 | 45 | 46 | 47* | 48 | 49 | 50 | 51 | 52 |
|---|---|---|---|---|---|---|---|---|---|---|---|---|---|---|---|---|---|---|---|---|---|---|---|---|---|
| | - | | | | | | | | | | | | | | | | | | | | | | | | |
| | I | 4x 7:3 | I | - | I | 4x 8:3 | - | 2x 17:6 | I | | II | I | - | | II | II | - | 2x 23:9 | | I | | | | | |
| | 3x 9:5 | | II | - | II | I | - | I | 5x 7:3 | 3x 12:5 | II | 2x 19:9 | 3x 13:6 | 5x 8:3 | I | I | 3x 15:7 | I | II | 6x 8:3 | 7x 7:3 | 2x 25:9 | 3x 17:6 | 2x 26:9 |
| | 9x 3:2 | 2x 14:9 | 6x 5:3 | | 2x 16:9 | 3x 11:6 | | 2x 17:9 | II | - | I | I | - | 2x 20:9 | II | 2x 22:9 | - | 2x 23:12 | I | - | I | I | - | I |
| | 3x 9:7 | I | II | I | I | I | - | I | II | 3x 12:7 | II | I | I | I | II | I | 9x 5:3 | I | II | - | II | 2x 25:12 | 4x 13:6 | I |
| | 3x 9:8 | 4x 7:6 | I | 3x 10:9 | II | 3x 11:9 | I | 2x 17:12 | I | 12x 5:2 | I | 2x 19:12 | - | 8x 5:3 | I | 4x 11:6 | 15x 3:2 | I | I | 3x 16:9 | I | I | 3x 17:9 | I |
| | II | I | II | ■ | I | - | ■ | I | II | 9x 4:3 | II | I | 3x 13:9 | I | II | II | 3x 15:11 | 2x 23:15 | II | - | II | 10x 5:3 | - | 2x 26:15 |
| | 3x 9:10 | 2x 14:15 | II | | I | 2x 16:15 | - | 2x 17:15 | I | 6x 6:5 | I | 2x 19:15 | - | 10x 4:3 | I | 2x 22:15 | - | I | I | I | - | I | - | I |
| | 3x 9:11 | I | II | 3x 10:9 | II | I | ■ | I | II | 3x 12:11 | II | I | - | I | II | I | 3x 15:11 | 2x 23:18 | II | - | II | I | - | I |
| | 9x 3:9 | 4x 7:9 | 6x 5:6 | - | 4x 8:9 | 5x 11:12 | 2x 17:18 | | I | ■ | I | 2x 19:18 | 3x 13:12 | 4x 10:9 | 6x 7:6 | 4x 11:9 | - | 2x 23:18 | I | 12x 4:3 | I | II | 2x 25:18 | 3x 17:12 | 4x 13:9 |

X : Multiple repetition of a low-pole winding; e.g., by joining two 8/6-pole windings, a 16/12-pole winding is created — : not realizable

Table V Required Minimum Numbers of Slots $Z_N$

| | $2p_1 =$ | 4 | 8 | <u>10</u>* | <u>14</u>* | 16 | 20 | <u>22</u>* | <u>26</u>* |
|---|---|---|---|---|---|---|---|---|---|
| $2p_2 = 6$ | $Z_N$ | 36 | 36 | 45 | 63 | 36 | 36 | 99 | 117 |
| $Z_N = \frac{G+N}{t_1} \cdot 9$ | $q_1$ | 3 | 1,5 | 1,5 | 1,5 | 3/4 | 3/5 | 1,5 | 1,5 |
| | $q_2$ | 2 | 2 | 2,5 | 3,5 | 2 | 2 | 5,5 | 6,5 |
| | G:N | 3:1 | 3:1 | 3:2 | 6:1 | 3:1 | 3:1 | 9:2 | 12:1 9:4 |

| | $u \times p_1':p_2'$ | 2x 2:3 | | 2x 4:3 | 2x 5:3 | | | 2x 7:3 | 2x 8:3 |
|---|---|---|---|---|---|---|---|---|---|
| $2p_2 = 12$ | $2p_1 =$ | 8 | <u>10</u>* | <u>14</u>* | 16 | <u>20</u> | <u>22</u>* | <u>26</u>* | 28 | 32* |
| | $Z_N$ | 72 | 45 | 63 | 72 | 90 | 99 | 117 | 126 | 72 |
| $Z_N = 9 \cdot \frac{G+N}{t} \cdot u$ | $q_1$ | 3 | 1,5 | 1,5 | 1,5 | 1,5 | 1,5 | 1,5 | 1,5 | 3/4 |
| | $q_2$ | 2 | 5/4 | 7/4 | 2 | 2,5 | 11/4 | 13/4 | 3,5 | 2 |
| | G:N | 3:1 | 3:2 | 6:1 | 3:1 | 3:2 | 9:2 | 12:1 9:4 | 6:1 | 3:1 |

| | $u \times p_1':p_2'$ | | 3x 2:3 | | | | 3x 4:3 | | 3x 5:3 | | | 3x 7:3 | | |
|---|---|---|---|---|---|---|---|---|---|---|---|---|---|---|---|---|---|
| $2p_2 = 18$ | $2p_1 =$ | 8 | <u>10</u>* | 12 | <u>14</u>* | 16 | 20 | <u>22</u>* | 24 | <u>26</u>* | 28 | <u>30</u> | 32 | <u>34</u>* | <u>38</u>* | 40 | <u>42</u> | 44 | <u>46</u>* |
| | $Z_N$ | 108 | 135 | 108 | 189 | 108 | 108 | 297 | 108 | 351 | 108 | 135 | 108 | 459 | 513 | 108 | 189 | 108 | 621 |
| $Z_N = 27 \cdot \frac{G+N}{t} \cdot u$ | $q_1$ | 4,5 | 4,5 | 3 | 4,5 | 9/4 | 9/5 | 4,5 | 1,5 | 4,5 | 9/7 | 1,5 | 9/8 | 4,5 | 4,5 | 9/10 | 1,5 | 9/11 | 4,5 |
| | $q_2$ | 2 | 2,5 | 2 | 3,5 | 2 | 2 | 3,5 | 2 | 6,5 | 2 | 2,5 | 2 | 8,5 | 9,5 | 2 | 3,5 | 2 | 11,5 |
| | G:N | 3:1 | 3:2 | 3:1 | 6:1 | 3:1 | 3:1 | 9:2 | 3:1 | 12:1 9:4 | 3:1 | 3:2 | 3:1 | 15:2 12:5 | 18:1 15:4 | 3:1 | 6:1 | 3:1 | 21:2 18:5 |

| | $u \times p_1':p_2'$ | | | 4x 2:3 | 3x 3:4 | 2x 5:5 | | 2x 7:6 | 4x 4:3 | | 6x 3:2 | | 4x 5:3 | 2x 11:6 | | | 2x 13:6 | 3x 9:4 |
|---|---|---|---|---|---|---|---|---|---|---|---|---|---|---|---|---|---|---|---|
| $2p_2 = 24$ | $2p_1 =$ | <u>10</u>* | <u>14</u>* | 16 | 18 | <u>20</u> | <u>22</u>* | <u>26</u>* | 28 | 32 | <u>34</u>* | 36 | <u>38</u>* | <u>40</u> | 44 | 46* | <u>50</u> | 52 | 54 |
| | $Z_N$ | 45 | 63 | 144 | 108 | 90 | 99 | 117 | 126 | 144 | 153 | 216 | 171 | 180 | 198 | 207 | 45 | 334 | 324 |
| $Z_N = 9 \cdot \frac{G+N}{t} \cdot u$ | $q_1$ | 1,5 | 1,5 | 3 | 2 | 1,5 | 1,5 | 1,5 | 1,5 | 1,5 | 1,5 | 2 | 1,5 | 1,5 | 1,5 | 1,5 | 3/10 | 1,5 | 2 |
| | $q_2$ | 5/8 | 7/8 | 2 | 1,5 | 5/4 | 11/8 | 13/8 | 7/4 | 2 | 17/8 | 3 | 19/8 | 2,5 | 11/4 | 23/8 | 5/16 | 13/4 | 4,5 |
| | G:N | 3:2 | 6:1 | 3:1 | 3:1 | 3:2 | 9:2 | 12:1 9:4 | 6:1 | 3:1 | 15:2 12:5 | 3:1 | 15:4 | 3:2 | 9:2 | 18:5 | 3:2 | 12:1 9:4 | 3:1 |

\*) means prime numbers for $p_1$

<u>underlined</u> first pole numbers $2p_1$ have $2\pi/3$ phaseband spread

Table VI
10/6 pole
$Z_N$ = 45 slots
G:N = 2:2
N in series

| | pitch | 10 pole $W_{10} = 3+2 = 5$ $\xi_{10}$ | field shape | 6 pole $W_6 = 3$ $\xi_6$ | field shape | $B_6/B_{10}$ |
|---|---|---|---|---|---|---|
| grouping α | 1 - 6 | 0,831 | Fig. 13d | 0,816 | Fig. 13e | 1,02 |
| | 1 - 7 | 0,731 | | 0,896 | | 0,816 |
| | 1 - 8 | 0,543 | | 0,937 | | 0,579 |
| | 1 - 23 | 0,831 | | 0,937 | | 0,887 |
| grouping β | 1 - 6 | 0,831 | Fig. 13d | 0,675 | Fig. 13e | 1,23 |
| | 1 - 7 | 0,731 | | 0,741 | | 0,986 |
| | 1 - 8 | 0,543 | | 0,775 | | 0,701 |
| | 1 - 23 | 0,831 | | 0,775 | | 1,07 |

Table VII
10/6 pole
$Z_N$ = 90 slots
G:N = 9:1

| pitch | 6 pole $\xi_6$ | field shape | 10 pole $\xi_{10}$ | field shape | $B_6/B_{10}$ N parallel $W_{10}=W_6=9$ | N in series $W_{10}=10; W_6=9$ |
|---|---|---|---|---|---|---|
| 1 - 8 | 0,5470 | Fig. 15c | 0,793 | Fig. 14b | 0,869 | 0,966 |
| 1 - 9 | 0,6080 | | 0,831 | | 0,820 | 0,911 |
| 1 - 10 | 0,6619 | | 0,844 | | 0,765 | 0,850 |

Table VIII
10/12 pole
$Z_N$ = 90 slots
G:N = 9:1

| pitch | 12 pole $\xi_{12}$ | field shape | 10 pole $\xi_{10}$ | phaseband coverage | $B_{10}/B_{12}$ N parallel $W_{12}=W_{10}=9$ | N in series $W_{12}=10; W_{10}=9$ |
|---|---|---|---|---|---|---|
| 1 - 8 | 0,855 | Fig. 16c | 0,902 | Fig. 16a $\pi/3$ | 0,79 | 0,88 |
| 1 - 9 | 0,855 | | 0,945 | | 0,75 | 0,84 |
| 1 - 8 | 0,855 | Fig. 16c | 0,793 | Fig. 16b $2\pi/3$ | 0,90 | 1,00 |
| 1 - 9 | 0,855 | | 0,831 | | 0,86 | 0,95 |

Table IX
14/12 pole
$Z_N$ = 63 slots
G:N = 6:1

| pitch | 14 pole $\xi_{14}$ | field shape | 12 pole $\xi_{12}$ | field shape | $B_{12}/B_{14}$ N parallel $W_{12}=W_{14}=6$ | N in series $W_{12}=6; W_{14}=7$ |
|---|---|---|---|---|---|---|
| 1 - 6 | 0,831 | Fig. 17c | 0,872 | Fig. 17d | 0,817 | 0,953 |
| 1 - 5 | 0,831 | | 0,814 | | 0,875 | 1,02 |

Table X
14/12 pole
$Z_N$ = 126 slots
G:N = 6:1

| pitch | $\xi_{14}$ | 14 pole field shape | $\xi_{12}$ | 12 pole field shape | $B_{12}/B_{14}$ N parallel $W_{12}=W_{14}=6$ | $B_{12}/B_{14}$ N in series $W_{12}=6; W_{14}=7$ |
|---|---|---|---|---|---|---|
| 1 - 11 | 0,831 | phaseband coverage $2\pi/3$ Fig. 18c | 0,869 | Fig. 18d | 0,820 | 0,956 |
| 1 - 10 | 0,844 |  | 0,850 |  | 0,851 | 0,993 |
| 1 - 11 | 0,945 | phaseband width $\pi/3$ Fig. 19b | 0,869 | Fig. 19b | 0,923 | 1,087 |

Table XI

| | connection 20/6 | $\frac{W_{20}}{W_6}$ | necessary number of turns of zero branch coils $W_N/W_G$ | flux density relation $B_{20}:B_6$ for coil pitch 1 - 13 $\xi_{20}=0,828$ $\xi_6=0,903$ | 1 - 12 0,953 0,895 | 1 - 11 0,898 0,872 |
|---|---|---|---|---|---|---|
| zero branch | $\triangle/\triangle^3$ | 3 | 3 | 1,211 | 1,044 | 1,078 |
| zero branch | $Y/\triangle^3$ | $3\sqrt{3}$ |  | 0,699 | 0,895 | 0,623 |
| zero branch with inner series connection | $\triangle/\triangle^3$ | 4 | 1 | 0,908 | 0,783 | 0,809 |
| zero branch with inner series connection | $Y/\triangle^3$ | $4\sqrt{3}$ |  | 0,525 | 0,452 | 0,467 |
| zero branch with outer series connection, shifted by $\pi/6$, 3 phaseband | $\frac{1}{\sqrt{3}} \cdot \frac{\sqrt{3}}{2} = \frac{1}{2}$    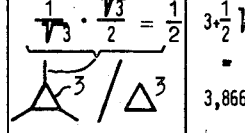$/\triangle^3$ | $3+\frac{1}{2}\sqrt{3}$ = 3,866 | $\frac{1}{\sqrt{3}}$ | 0,940 | 0,810 | 0,837 |
| zero branch with outer series connection, shifted by $\pi/6$, 6 phaseband | $\frac{1}{\sqrt{3}}$   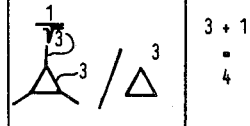$/\triangle^3$ | $3+1 = 4$ |  | 0,908 | 0,783 | 0,809 |
| zero branch with outer series connection, coaxial | $\frac{1}{\sqrt{3}}$   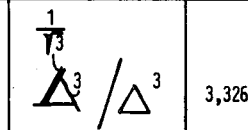$/\triangle^3$ | 3,326 |  | 1,093 | 0,941 | 0,973 |

Table XIII

| combination scheme | shift $\delta$ | resulting phase-band grouping | distribution factor $\xi_z$ |
|---|---|---|---|
| asymmetrical | 90° | | 0,685 |
| | 70° | | 0,760 |
| | 50° | | 0,814 |
| | 30° | | 0,843 |
| | 10° | | 0,847 |
| | -10° | | 0,826 |
| | -30° | | 0,779 |
| | -50° | | 0,710 |
| asymmetrical | 70° | | 0,707 |
| | 50° | | 0,738 |
| | 30° | | 0,785 |
| | 10° | | 0,789 |
| | -10° | | 0,769 |
| | -30° | | 0,725 |
| | -50° | | 0,660 |
| symmetrical | 90° | | 0,650 |
| | 70° | | 0,700 |
| | 50° | | 0,729 |
| | 30° | | 0,726 |
| | 10° | | 0,720 |
| | -10° | | 0,623 |
| | -30° | | 0,625 |

Table XII

Different phaseband groupings for $q_1 = 6$ (only one layer)

| | distribution factor $\xi_z$ |
|---|---|
| a) | 0,956 |
| b) | 0,927 |
| c) | 0,870 |
| d) | 0,841 |
| e) | 0,815 |
| f) | 0,786 |
| g) | 0,736 |
| h) | 0,898 |
| i) | 0,871 |
| k) | 0,818 |
| l) | 0,734 |

Table XIV Phase-interspersed for $p_2 = 3n$

| | Elementary grouping with $(30/k)°$-wide subsectors for $2p_1 = 3m$ and $G : N = 3 : 1$ | Phaseband distribution factor $\xi_Z = 0,9107$ | |
|---|---|---|---|
| | | total distribution $\xi_Z = \xi_Z \cdot \xi_V$ factor $\xi_V$ | *) $\xi_Z$ |
| $k=2$ Variant α | | 0,9914 | 0,9029 |
| β | | 0,9239 | 0,8414 |
| γ | | 0,7934 | 0,7225 |
| $k=3$ Variant α | | 0,9899 | 0,9015 |
| β | | 0,9598 | 0,8741 |
| γ | | 0,9302 | 0,8471 |
| δ | | 0,8724 | 0,7944 |
| ε | | 0,8440 | 0,7686 |
| ζ | | 0,7619 | 0,6938 |

*) with $\xi_V$ as displacement factor due to displacement angle between the elementary groupings Table XV  Number of Periodicity or Symmetry Axes for the Goerges polygons

| | | Phaseband spread for $p_1$ | | |
|---|---|---|---|---|
| | | $\pi/3$ | $\pi/3$ phase interspersed to $2\pi/3$ | $2\pi/3$ |
| for $p_1$ | coil pitch W arbitrary | 6 | 6 | 3 / $W=\tau$ 6 |
| for $p_1$ | zero branch omitted or series connected with $W_N \neq \frac{W_G}{3}$ | 3 | 3 | 3 |
| for $p_2$ | coil pitch W equal to $\tau_2$ | 6 | 6 | 6 |
| for $p_2$ | coil pitch W not equal to $\tau_2$ | 1 | $P_1$ = even: 3; $\frac{p_1}{p_2}$ double odd: 1) 6, 2) 3, 3) 0 | 3 |

1) Two part systems (pos.-neg.) identically and phase-equally grouped
2) All winding branches assembled of the same number of coils from the two part system
3) At differentiating division

POLE CHANGEABLE THREE PHASE WINDING

BACKGROUND OF THE INVENTION

This invention relates to pole changeable three phase winding in general and more particularly to a pole changeable three phase winding for a fractional pole pair ratio of the first and second numbers of pole pairs $p_1$ and $p_2$ according to $p_1 \cdot p_2 = (3m \pm 1) : 3n$, with $p_2 = 3n$ is an integral multiple of the number of phases, where m and n are positive integers.

The step-wise change of the speed desired in three phase machines, particularly asynchronous squirrel cage motors, by suitably changing the effective number of stator poles, can be achieved at economically justifiable cost in two ways. The first way is to use a separate stator winding for each desired number of poles; this allows far reaching freedom in the design of the winding for practically any pole number ratio desired and makes possible, in particular, large steps in speed. Since only part of the slot cross section is available for each winding, relatively high copper losses, reduced torque and poorer cooling of the windings result. The utilization of such a machine is therefore greatly reduced. Also, the manufacturing costs for such a stator with separate windings are relatively high.

A better utilization of such electric machines can be achieved with a single, pole changeable winding for the different speed steps. For many pole number ratios, this is possible by using the principle of current reversal always in one half of the phase windings. For two speed steps with only six terminal points a separately changeable Y-point bridge is necessary, in addition to a three-pole double-throw switch. A special case of such pole switchable three phase windings is the most frequently used Dahlander circuit for a pole number ratio of 2:1.

Stator windings with a pole number ratio different from 2:1 have become known as so-called pole amplitude modulated stator windings or PAM windings (cf. H. Schetelig and R. Weppler, "Polumschaltbare Drehstrom-Kaefiglaeufermotoren mit PAM Wicklung" -Pole-switchable Three-Phase Squirrel Cage Motors with PAM Windings-ETZ-A Vol. 92 (1971), no. 10, pages 576 to 579, as well as the patent literature cited there). With the PAM windings also, each phase winding is subdivided in the middle and the poles are changed by always reversing the direction of the current in one half of the phase. In general, the number of individual coils for each pole and phase winding are different from pole to pole. In PAM windings, the coil arrangement of the three phase windings is also different if one of the numbers of pole pairs is a multiple of three. As a rule, two layer windings with coils of equal coil pitch are used for this purpose, the coil pitch usually being designed with the pitch diameter of the higher number of poles.

In these PAM windings, symmetry of the field shape is dispensed with and partly strongly developed undesired even harmonics and subharmonics must be tolerated. According to Sequenz, "Die Wicklungen elektrischer Maschinen" - The Windings of Electric Machines, vol. 3, Springer-Verlag, Vienna, 1954, perfect winding symmetry which is otherwise necessary in order to avoid such field harmonics, with the same number of coils per phase for each pole, has heretofore always been sought, which led to considerably more complicated windings with a relatively large number of terminal points and accordingly expensive switching devices.

Subharmonics and even harmonics of the field must be avoided as far as possible, especially in asynchronous machines with a relatively small air gap because of possible parasitic effects such as noise, vibrations, torque, harmonics, shaft voltages, etc. Except for a pole pair number ratio $p_1 \cdot p_2 = 2:1$ (Dahlander circuit), this cannot be achieved, however, by using the principle of current direction reversal in one half of the phase winding (PAM windings). Rather, the individual winding branches must be regrouped circuit-wise for this purpose, changing the assignment to the three phase windings in cyclically interchanged sequence, for which purpose considerably more than six terminal points and accordingly expensive switching devices are required, which, among other things, also follows from the cited book by Sequenz.

Thus, according to the German Pat. No. 656,277, at least twelve terminal points are required for windings that are pole changeable in the ratio 3:2, and still nine terminal points as well as corresponding switch-in means for a winding according to the German Auslegeschrift No. 1 022 306. In both cases, the individual winding branches of the symmetrically arranged three phase windings are regrouped, after the pole changing, with a cyclically interchanged phase assignment.

From the German Auslegeschrift No. 2 107 232, pole switchable three phase windings with only six terminal points are known, in which the pole changing is likewise accomplished by cyclical interchange of the phase assignment. However, here the individual winding branches, which are triple-Y-connected for both pole number stages, must be formed by coils or groups of coils with different numbers of turns. The necessary number of turns must be determined as a function of the desired number of poles from the spatial location of the coils via trigonometric functions, which is laborious and makes the fabrication of such windings considerably more difficult. Since only integral numbers of turns for the coils can be realized in practice, calculated values must be rounded off up or down in each individual case, and asymmetries remain in the parallel winding branches, so that circulating currents caused thereby can flow.

Internal equalization currents also occur, incidentally, in the winding according to the German Auslegeschrift No. 1 022 306, since the winding branches which are connected parallel in the pole number step with the triple delta connection have different phases.

A circuit similar to that from the German Auslegeschrift No. 2 107 232 is known from the journal "Revue Générale d'Electricité" 82 (1973), 5, pages 323 to 329. The 6/4-pole three phase winding discussed there with only six terminal points represents a special case of so-called phase-modulated windings, which normally require considerably more than six connecting ends. This three phase winding has a triple Y connected first winding part with separate Y points, which is effective, i.e., current carrying, for both pole numbers, and a second winding part which is connected to the ends of the first winding part which are tied together and which carries current only in 6 pole operation. As a result of the fact that phase windings of a 4 pole winding basically can not be subdivided into three parallel branches of equal design, a rotating field with a high harmonic content and pronounced subharmonics ($v = 1/2, 5/2, 7/2$ etc.) and even harmonic is generated in 4 pole operation in this known pole changeable three phase winding. Such harmonic fields affect the operating behavior adversely, and particularly in asynchronous machines with a small air gap, noise, vibrations, torque harmonics or shaft voltages can appear as parasitic effects.

With the pole changing based on an interchanged phase assignment of individual winding branches, an adaptation of the numbers of turns effective for the two numbers of poles is posible only by chording the coils to a relatively limited extent, which, however, is always accompanied by a degradation of the shape of the field curve. The coil pitch most favorable with respect to the field shape corresponds, in most cases, to the pole pitch for the higher number of poles. On the other hand, adaptation is facilitated in the case of PAM windings, since besides the possibility of coil chording, the variants with Y, delta, double Y and double delta connections known from the Dahlander circuit are available.

SUMMARY OF THE INVENTION

It is an object of the present invention to provide pole changeable three phase windings for the multiple possible combinations of pole numbers, mentioned at the outset, which require a small number of terminal points, if possible, only six or nine, and can be implemented with a simple switching device, wherein adaptation with considerable freedom and without affecting the symmetry of the field of both pole numbers adversely is to be achieved even for relatively large pole number spreads, using simple and largely identical winding coils of conventional design. In addition, the three phase windings mentioned should have, for both pole numbers at least far reaching symmetry, so that no internal equalization currents can be excited and even field harmonics and subharmonics are suppressed as completely as possible.

According to the present invention, the stated problem is successfully solved by providing that for the first pole number $2p_1$, each phase winding consists of $2p_1/t$ equal winding branches, of which a number G, divisible by three, of so-called base winding branches carried current for the first pole number $2p_1$ as well as for the second pole number $2p_2$, where, for the second pole number $2p_2$, one third each of these G base winding branches is assigned to all three phase windings and the remaining N winding branches are designed as so-called zero branches which are ineffective for the second pole number $2p_2$, so that a division into base winding and zero branches according to $G + N = 2p_1/t$ takes place, where t is an integral divisor of the first pole number $2p_1$.

A condition necessary for the division into G and N winding branches is therefore that the coils belonging to a phase winding formed, for the first pole number $2p_1$, by $2p_1/t$ equiphase winding branches are fanned out with respect to their phase, without gap and overlap, over the entire periphery of the coil side star for the second pole number $2p_2$, which is divisible by three. While this is the case with pole number ratios of the type "even numbered to odd numbered" for customary winding arrangements with phase bands of $\pi/3$, the phase bands for the first pole number $p_1$ must then extend over a range $2\pi/3$ if the pole number ratio is doubly odd numbered. For this purpose, three phase band windings or appropriate phase interspersing can be provided.

Characteristic are the so-called zero branches which form equal winding branches only for the first pole number $2p_1$ and are ineffective for the second pole pair number $p_2$, which is divisible by three. With $2p_1$ zero branches designed cophasally with the base winding branches, the coil voltage induced in $2p_2$ pole operation always add up to zero.

In the coil side star for $p_2 = 3n$, we have a triaxially symmetrical phase band or sector arrangement with zero branch sectors $\Psi$ alternatingly located between sectors of width $\phi$ occupied by the base winding branches. According to the division ratio into base and zero winding branches, these sector angles are overall $$\phi/\Psi = G/N$$

with $$\phi + \Psi + 2\pi/3,$$

where the sectors belonging to the zero and base winding branches may also be composed of elementary sectors arranged interspersed.

The coil side star and the phase band distribution plan for $2p_2 = 3n$ is an important aid for the practical design of the windings, to make the assignment of the coils to the individual branches.

Since the invention starts out from a conventional winding distribution for $2p_1$, the situation is completely symmetrical for the first pole pair number, independently of the chosen coil span or pitch. In the second pole number stage, the base winding alone is effective. Due to its three phase band winding configuration, no even harmonics appear only if, diameter coils with respect to $p_2$, are present. A deviating pitch arrangement therefore adversely affects the field symmetry for $p_2$.

While changing the coil pitch simultaneously affects the effective numbers of turns of both pole number stage via the chording factors, a mutually independent determination can be obtained by means of phase interspersing, where the coil pitches can always be left at the optimum value $W = \tau_2$. Particularly for larger slot numbers per pole and phase, many different variants can be carried out by phase interspersing at the first pole number, whereby the distribution and winding factors and therefore, the ratio of the air gap inductions, can be varied over a wide range, with the circuit unchanged. Phase interspersing, in which winding phase bands $\pi/3$ wide are fanned out over twice the extent of $2\pi/3$, represents an important special case, since a particularly advantageous field symmetry is obtained with such windings.

A particularly simple kind of pole changing with only six connection terminals and only one three pole switch is obtained if the G base winding branches for the first pole number $2p_1$ are permanently connected in a triple Y connection to three separate neutral points, the latter forming the connection points for the second pole number stage. The zero branches, the number of turns of which is adapted accordingly, can be connected as desired, parallel to or in series with the base winding. In the latter case the number of turns effective for the first pole pair number $p_1$ is increased, which is advisable in view of a desired equalization of the air gap induction, if $p_1$ is larger than the second pole pair number $p_2$, which is divisible by three. In view of equal current density and constant m.m.f. in the coils, the numbers of coil turns $w_N$ of the zero branches must be reduced relative to the numbers of coil turns $w_G$ of the base winding to 1/3, and their conductor cross sections must be increased by a factor 3. If the power is greatly different, for instance, in blower drives, considerably larger current densities are permissible without thermal danger in the zero branches which are connected in series for the high pole number, i.e., their cross section can be reduced substantially and the number of turns can be increased instead. Instead of increasing the number of turns of the zero branch, it can also be reduced, however; in the extreme, i.e., with $w_N = 0$, it can be omitted altogether.

However, both cases lead to a disturbance of the magnetic symmetry and cause greatly increased field ripple with subharmonics. The slot space vacated by the omission of the zero branches can be utilized, for instance, to arranged a supplemental winding for the other pole number and to thereby increase the effective number of turns for $p_2$, similarly to series connected zero branches for the first pole number.

In a three phase winding according to the present invention with a base winding connected in triple Y/triple Y connection, the numbers of coil turns are larger, due to the multiple parallel branches, than in the case of the known PAM windings with delta/double Y and Y/double Y connection, so that according to the realizable integral numbers of coil turns, a voltage matching with finer steps is possible, or application to low voltage machines with higher power is also feasible.

The measures possible through phase interspersing, changing the coil pitch as well as optional parallel or series connection of the zero branches for matching the effective numbers of turns are not always sufficient in the case of large pole number spreads and/or for blower motors, especially since then relatively low winding factors would have to be tolerated at the lower pole number, which makes the utilization of the machine poorer. In these cases, it is advantageous to provide, for the base winding, a delta/triple delta or Y/triple delta connection scheme, where the zero branch, the number of turns of which is designed accordingly, may likewise be connected to the base winding parallel or with "inner" or "outer" series connection. Depending on the design, the required number of terminals increases to 9 to 12 terminals and bridge connections for the multiple delta stage must be made for switching. Compared to the designs with 6 terminals and a base winding connected triple Y/triple Y, the ratio of the number of phase winding turns "many poles/few poles" increases from one to three in the case of delta/triple delta or $3\sqrt{3}$ in the case of Y/triple delta switching. For "inner" series connection of the zero branches, these ratios can further be increased, for $p_1 >> p_2$, $(1 + N/G)$ times, all winding coils of the zero and base winding branches being designed with the same number of turns or the same wire cross section.

The difference between "inner" and "outer" series connection is that for the "inner" series connection, the zero and base winding branches are directly connected in series in each phase winding and the three phase are delta or Y connected. For the "outer" series connection, the zero branches are connected to the respective triangle corners of the base winding. Since then the zero branches carry $\sqrt{3}$ times the phase current, numbers of coils turns reduced by the same factor are required for the same current densities with accordingly increased conductor cross sections. Because of the phase position simultaneously shifted by $\pi/6$, it is advisable to make the zero branches with axes likewise shifted by $\pi/6$.

For the practical design of three phase windings which can be pole changed in accordance with the present invention, two layer windings with coils of equal width are particularly well suited. In all winding arrangements, in which at least two coil sides belonging to the same winding branch always lie side by side, they can be combined in concentric groups of coils. This is possible, for instance, with the variants a, d and l shown in Table XII, where two respective directly adjacent coil sides can be combined as concentrically installed double coils. A design of the winding with such concentric groups of coils permits different numbers of conductors in the outer and inner coils, without thereby changing the phase of the total coil voltage.

In this manner, the individual coils can be designed with alternatingly different numbers of conductors per layer in the case of coil groups with a mean pitch diameter for an odd second pole pair number ($p_2 = 3n$), for instance, 4 + 5 conductors per slot. Depending on whether the effective number of turns of the higher or lower pole pair number is to be increased, the inner or the outer coils are given the larger number of turns, where the differences between the numbers of turns of both coils can also be larger than "one". The difference "one" allows the customary "half" turns, e.g., 4.5 turns according to the example above. With coils of equal pitch, different numbers of conductors can otherwise be realized only with a coil pitch deviating from the pole pitch for $p_2$.

If, starting with such a two layer winding, every second coil is left off, i.e., the inner or outer coil of a doubly concentric group of coils, and the remaining coils are made instead with twice the number of turns, a single layer winding is obtained which, while it does have somewhat larger harmonic fields than a two layer winding, is in return of particularly simple design. A necessary condition for such windings which are constructed single layer or with concentric groups of coils, is a number of slots which is increased two or more times over the required minimum number of slots.

Two layer windings according to the present invention with regularly designed zero winding branches correspond, with uninterspersed phase bands, to those of conventional three phase windings as far as the harmonic fields present for $p_1 = 3n \pm 1$ are concerned. By means of phase interspersing, the winding factors can be varied within relatively wide limits in order to obtain, with the circuit unchanged, a favorable effective number-of-turns ratio, or a favorable flux density relation. However, an increased harmonic component can thereby occur. Since such harmonic fields have an adverse effect on the operating behavior, for instance, of an asynchronous machine, their elimination or reduction is of interest particularly in larger machines.

For this purpose, two mutually offset or differently designed subwindings can be superimposed and their respective winding branches can be connected in series. In analogy to the German Offenlegungsschrift No. 2 221 115, individual coils can also be combined in a manner known per se, wherefrom easily fabricated, so-called phase band overlapped two layer windings result. With symmetrically developed zero branches, the harmonic fields of both pole numbers can thereby reduced to the same size also with non-chorded or 2/3 chorded coils, as in favorably chorded, non-pole changeable two layer windings. With other coil pitches, one obtains an additionally reduced harmonics content (low harmonics winding). Offsetting the subwindings is equivalent to coil chording with respect to reduction of harmonics. While the manufacturing costs of such windings are similarly high as with separate windings, the machine utilization is substantially better.

As already mentioned, one can also omit the zero branches which anyhow are effective only for one pole number. Such a design of the winding with the base winding alone, however, results in only G/(G+N) of the cross section that is available with uniform slotting and which could be wound being wound. In order to avoid unfavorable partial winding of slots and to utilize the magnetic circui better, the shape and size of the slots can be matched to the respective coil side occupancy. However, the distribution of the winding phase bands for the first pole pair number $p_1 = 3m \pm 1$ over the individual poles is not symmetrical here, which causes field harmonics of fractional order as well as even numbered harmonics. A worsening of the harmonic content, however, takes place only for the first pole pair number $p_1 = 3m \pm 1$. The shape of the field for the second pole pair number $p_2 = 3n$ remains uninfluenced thereby.

Also the balance of all parallel connected winding branches, which was assumed in the discussion so far, can optionally be dispensed with if the equalization currents which then appear can be tolerated. In that case, pole changeable three phase windings can be realized for smaller slot numbers.

It is also possible to apply, in a manner known per se, a lower supply voltage for one of the two pole pair numbers, particularly by means of series chokes coils or inductive voltage dividers. Instead of zero winding branches which carry current only for the pole pair number $p_2$, a separate supplemental winding for the other pole pair number $p_1$ can be provided. A uniformly distributed secondary winding can also be arranged for one of the two pole pair numbers, which is permanently connected to the terminals of the pole pair number in question.

A particularly advantageous possible application of the windings according to the present invention with triple Y/triple Y switching of the base winding exists for pumped storage machines of large power rating, in which separate windings have been necessary heretofore because of the lack of suitable pole switchable three phase windings (see BBC-Mitteilungen 7/74, pages 327 to 331). For the relatively small pole number differences required for this purpose in generator and motor operation, the three phase winding according to the present invention appears particularly advantageous. The coils which are designed with a pitch diameter for the pole pair number divisible by three have practically optimum chording for the other pole number, so that a minimum harmonic content results without the need for special measures such as superposing two mutually offset subwindings for low harmonic winding variants.

If used in pole changeable asynchronous machines, a substantially larger power range can be covered than with the known PAM windings; for one, because of the more favorable winding symmetry and the smaller field harmonic content caused thereby. On the other hand, much finer matching of the magnetization according to the attainable steps of the effective numbers of turns is obtained because of the larger number of parallel winding branches and the possibility of phase interspersing.

The invention is applicable to equal advantage for three phase windings in the stator and/or rotor in rotating machines as well as in linear or sector shaped travelling field machines.

In addition, the invention will be explained in the following in detail, particularly for different outstanding embodiments of such three phase circuits, also as to the basic theory, with reference to the drawing and the Tables.

BRIEF DESCRIPTION OF THE DRAWINGS

FIG. 1 illustrates the phase bands of the windings belonging to a phase for the first pole pair number $p_1$ for a conventional $\pi/3$ spreaded winding arrangement.

FIG. 2a and 2b, show the changed phases and phase band widths for a winding that can be changed from $2p_1 = 8$ or 10, respectively, to $2p_2 = 6$.

FIG. 3 shows the subdivision of the coil side star from $p_2 = 3n$ into base winding and zero branch sectors.

FIGS. 10a, 10b, 10c, 10d and 10e illustrate the phase of the currents for zero branches in an outer series connection and possible designs therefor with winding axes shifted by $\pi/6$.

FIGS. 13a, 13b, 13c, 13d, 13e, 14a, 14b, 14c, 15a, 15b, 15c, 16a, 16b, 16c, 16d, 17a, 17b, 17c, 17d, 18a, 18b, 18c, 18d, 19a, 19b, 20a, 20b, 20c, 20d, 20e, 21a, 21b, 22a, 22b, 23a, and 23b show examples in which the respective spatial coil side distribution of a phase winding of the first pole number, its correlation to the individual winding branches of the base winding and to the zero branches, the field shape present in the polar presentation of the Goerges polygon for two layer windings with different coil pitches, and the coil side stars are shown in detail:

FIGS. 13a-13e shows a 10/6-pole winding for the minimum slot number $Z_N = 45$ slots, with original phase bands $2\pi/3$ wide.

FIGS. 14a-14c and 15a-15c illustrate two variants of a 10/6-pole winding for $Z_N = 90$ slots, with phase interspersing.

FIG. 16a-16d illustrates a 10/12-pole winding for $Z_N = 90$ slots.

FIGS. 17a-17d, 18a-18d and 19a-19b show various 14/12-pole windings for $Z_N = 63$ and 126 slots.

FIGS. 20a-20e shows a 20/6-pole winding for $Z_N = 72$ slots, which is advantageous for a delta/triple delta or Y/triple delta switching arrangement.

FIGS. 21a, 21b, 22a, 22b, 23a and 23b illustrate balanced or $\pi/6$ shifted zero branches for outer series connection, combined in different ways.

Figure 4:
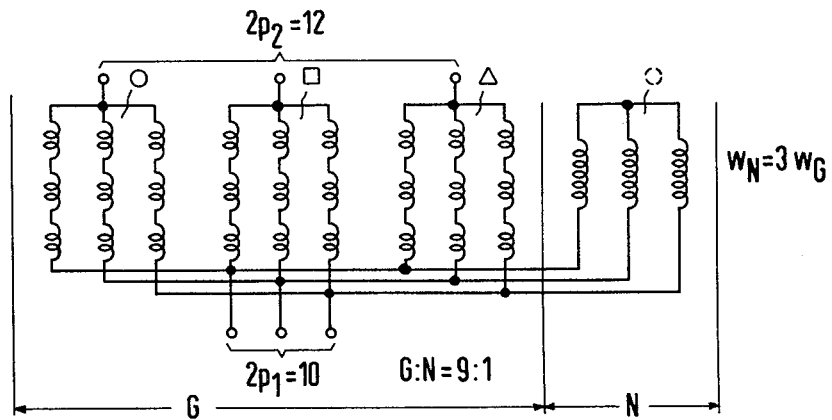
FIG. 4 is a winding circuit diagram with a base winding connected triple Y/triple Y with six terminals and parallel connected zero branches with $G:N = 9:1$.

The supplementary Tables include the following compilations:

Table I shows systematic subdivision possibilities into G base winding branches and N zero branches for different $m = 1$ to 9 and $2p_1 = 4$ to 56.

Table II shows the number of terminals required and applicable turns ratios for different circuits with parallel zero branches.

Table III shows variants which require a phase band spread of $2\pi/3$ for an odd first pole pair number.

Table IV shows various pole number combinations up to $p_1 = 52$ and $p_2 = 36$.

Table V shows required minimum slot numbers of windings with $2p_2 = 6, 12, 18, 24$.

Tables VI to XI show the winding factors, flux density relations and field shape references for the windings given in FIGS. 13 to 23 for different coil pitches and winding connections.

Tables XII and XIII show different phase interspersing and its systematics with the first pole number for an example with $q_1 = 6$ slots per pole and phase.

Table XIV shows various interspersed phase band arrangements for the second pole number, derived from elementary groupings with $G:N = 3:1$.

Table XV shows influence of phase band spread and coil pitches on the shape of the field and the symmetry for both pole numbers.

DETAILED DESCRIPTION OF THE INVENTION

The terms used in the following are defined as follows: Winding branches consist of an equal number each of series connected coils.

Phase winding of each phase is composed of several winding branches. Slot star indicates the phase of the individual slots in electrical angle degrees and always is applicable to corresponding number of poles. Coil side star (with the same numbering as the slot star) refers to the respective coil sides lying in a slot layer. Winding phase bands are sections occupied by coil sides of the same phase winding or winding branch (i.e., regions of the circumference in the machine or sectors in the coil side star). Phase band axis is the symmetry line of a winding phase band.

The symbols $\bigcirc$, $\triangle$, $\square$ designate the base winding branches and $\ominus$, the zero branches. The base winding branches identified by the same symbols belong to the same respective phase windings, for the second pole number $2p_2$.

It is a basic assumption for the pole changeable windings according to the present invention that the respective, equal phase winding phase bands of a phase winding for the first pole number $2p_1$ are fanned out without gap or overlap over the entire circumference of the slot or coil side star with respect to their phases for the second pole number $2p_2$. Spatially, the winding phase bands mentioned are situated uniformly distributed over the circumference, spaced by the pole pitch $\tau_1$. For a conventionally designed, non-interspersed integer slot winding they always comprise $q_1 = Z_N/6p_1$ coil sides accommodated in adjacent slots. Successive winding phase bands have alternately directed linkages, which is expressed in FIG. 1 by the arrow heads which point away from the center for the odd numbered phase band axes and point toward the center for the even numbered phase band axes. The phase band spread is $\pi/3$ for the first pole pair number $p_1$; for the second pole pair number $p_2$, it is changed in the pole pair ratio to $\beta = (\pi/3)(p_2/p_1)$.

Succeeding phase bond axes, which are spaced by the electrical angel $\pi$ for the first pole pair number, then include the angle $\alpha = \pi(p_2/p_1)$, as is shown in FIG. 2a for 8/6-pole changing and in FIG. 2b for 10/6-pole changing. The respective angle between the immediately adjacent phase band axes is designated as $\alpha'$.

For the assumed fanning out of the winding phase bands without gap and overlap over the entire periphery of the slot star, $\beta/\alpha'$ must be an integer. For original windings with phase band spreads of $\pi/3$ for the first pole number $2p_1$, however, this is the case only if the pole pair number ratio $p_1:p_2$ or $p_2:p_1$ is an even number: odd number fraction (FIG. 2a).

In the case of an odd:odd pole pair ratio (double odd ratio), on the other hand, $\beta:\alpha'$ is a fraction with the number two in the denominator (FIG. 2b), so that with phase band spreads of $\pi/3$ wide for the first pole pair number $p_1$, the stated requirement of filling the entire circumference of the coil side star without overlap and gap is not fulfilled for the second pole pair number $p_2 = 3n$. In such a case, it is therefore necessary to either provide three phase band windings with one half the number of double-spreaded winding phase bands $2\pi/3$, which however, limits the possibilities of division into same phase winding branches, or, with an unlimited number of parallel branches, it is necessary to intersperse the phases over twice the phase band range, which will be discussed later on in detail with reference to specific embodiments.

If both pole pair numbers have a common divisor $u$, then $u$-times congruent stars are obtained with $2p_1/u$ or $p_1/u$ different phase band axes. $u$ represents a multiplication factor, according to which a lower pole winding is repeated in a practical case $u$ times at the circumference of the machine.

The characteristic feature of windings according to the invention is the subdivision of each phase winding of the first pole number $2p_1$ into $2p_1/t$ equal phase winding branches. Of these, a number G, divisible by three, forms the so-called base winding, which is effective for both pole numbers and one third of which is regrouped for pole changing to the second pole number $2p_2$ over all three phase windings. The remaining N winding branches are designed as so-called zero branches and are effective only for the first pole pair number $p_1$. In the second pole number, with $2p_2 = 3n$, however, the voltages induced in them add up to zero.

Characteristically, the winding coils in the individual winding branches are arranged for this purpose in such a manner that a triaxially symmetrical sector arrangement according to FIG. 3 is obtained for the winding phase band which is fanned out over the entire circumference of the coil side star for $2p_2 = 6n$ with respect to its phase. Between the sectors of width $\phi$ formed by the base winding branches $\bigcirc$, $\triangle$, $\square$ are respectively located the sectors of width $\Psi$ formed by the zero branches. According to the subdivision into base winding and zero branches, the ratio of the sector angles is $\phi/\Psi = G/N$ with $\phi = \Psi = 2\pi/3$.

Besides the sector subdivision shown in FIG. 3, interspersed phase band subdivisions are also possible for $p_2 = 3n$, to which end the sectors $\phi$ and/or $\Psi$ can be subdivided and arranged mutually displaced, as will be explained further in the following, referring to specific embodiments.

Each zero branch is composed of three series connected winding sections which correspond to the three zero branch sectors ◯ in FIG. 3, which are mutually shifted by $2\pi/3$, or to a respective part thereof.

Particularly simple pole changing with only six terminals and only one three pole switch is possible if the winding branches of the base winding are connected, in a manner known per se, in triple Y connection ($Y^3$) with three separate neutral points, forming the connection points for the second pole number. The zero branches can then likewise be Y connected and connected to the base winding in parallel.

Since $\pi/3$ phase band spreaded integral slot windings can be subdivided regularly into at most $2p_1$ equal parallel branches, the following relationship applies for the number of winding parts forming the respective base and zero branch windings: $G + N = 2p_1/t$, where $t$ is an integral divisor of $2p_1$.

A $2p_1 = 10$ pole phase winding can be subdivided, for instance, into ten or five cophasal branches. The number G of the base winding branches present for both pole numbers is three or a number divisible by three, so that, according to FIG. 4, a division $G/N = 9:1$ can be chosen in the case of ten cophasal branches. The coils of the parallel connected zero branches must be wound for this purpose with three times the number of turns. Starting out with five cophasal branches, however, all coils can also be given the same number of turns and can be connected in parallel as per FIG. 5. The zero branches comprise in this case 2/5 of the entire winding.

Since with parallel connected zero branches, the same numbers of turns $w_1 = w_2$ are effective in both pole number stages, this circuit is suitable particularly for pole pair numbers $p_1$ and $p_2$ which are close together so as to obtain, in operation with the same voltage, equalized air gap flux densities $B_1$ and $B_2$ in accordance with $$B_1/B_2 = \frac{w_2 \cdot \xi_2}{w_1 \cdot \xi_1} \frac{p_1}{p_2}.$$

Figure 6:
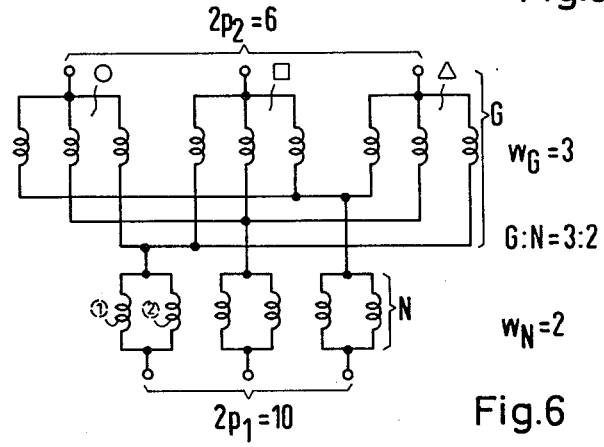
FIG. 6 shows the same circuit of the base winding branches as FIG. 5 and series connected zero branches with $G:N = 3:2$.

According to FIG. 6, the zero branch can also be connected, with the same number of terminals, to the base winding in series. This increases the number of turns effective for the first pole number $2p_1$, so that this circuit variant is advisable for $p_1 > p_2$ and larger pole number differences, in order to match the flux densities in the air gap to each other. The circuit as per FIG. 6 is suitable, for instance, for a winding change from 10 to 6 poles, where the number of turns of the base winding and zero branch coils must have the ratio 3:2 in view of constant current density and equalized coil m.m.f. for $2p_1 = 10$.

Table I shows a systematic compilation of the subdivisions possible for different first pole numbers $2p_1 = 4$ to 56 of the entire winding into G base winding and N zero branches. The numbers G and N are relative numbers, which are related in each case to the maximum possible number of parallel branches $a_{max} = N + G = 2p_1$.

Figure 5:
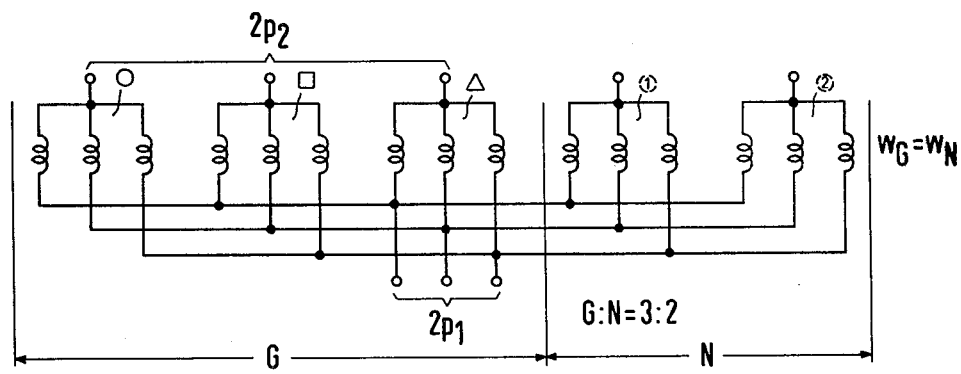
FIG. 5 illustrates the same circuit as in FIG. 4, with $G:N = 3:2$.

Depending on whether the zero branches are connected to the base winding in parallel or in series, different numbers of turns are required for the base winding and zero branch coils in the circuits according to FIGS. 4, 5 and 6. While all winding branches belonging to one phase are cophasal and have the same winding factor in these circuits, the zero and base winding branches are in general composed of different numbers of coils, however.

In view of voltage equality, one has, with parallel connection, $$w_{N(II)} = G/3N \cdot w_G \cdot a_N$$

for the required coil turns numbers, and because of the tripled coil current for series connection:

$$w_{N(--)} = (1/3) w_G \cdot a_N,$$

where $w_G$ and $w_N$ are the turn numbers of the coils of the base winding and zero branches of the possible zero branch parallel paths. By an $a_N$ times zero branch parallel connection, the required coil turns number $w_N$ is multiplied correspondingly; see, for instance, FIG. 5, where $a_N = 2$ parallel zero branches are provided in order to obtain the same coil turns numbers $w_N = w_G$ throughout. The number of maximally possible zero branch turns numbers $a_{N,max}$ is determined by the largest common divisor $t$ of the numerical values given in Table I for G and N. For certain applications, particularly for large pole number differences and/or for motors for driving pumps or blowers, it is desirable to increase the number of turns effective at the large pole number considerably.

Figure 7A:
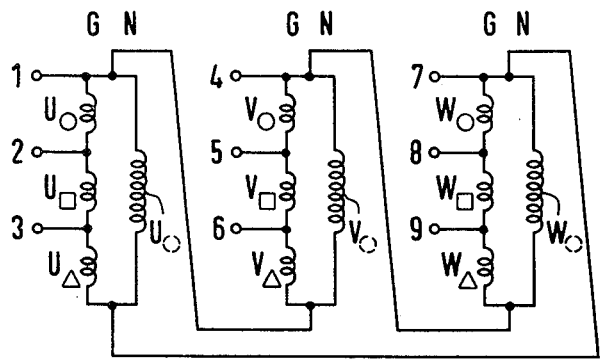
FIGS. 7a, 7b, 7c, 8 and 9 illustrate different winding circuit diagrams for larger pole number spreads with base winding branches connected delta/triple delta or Y/triple delta, respectively, and respectively parallel connected zero branches.

In case where $p_1 \gg p_2$, e.g., for 16/6 or 20/6 pole machines, one can use for this purpose a delta/triple delta ($\Delta/\Delta^3$) switching scheme for the base winding, as indicated in FIG. 7. The zero branches, the number of turns of which is chosen accordingly, are always connected in parallel to the three series connected zero branches. Contrary to the relation given for the previous circuit, this requires a coil number of turns increased three times, $w_{N(II)\Delta} = (G/N) w_G \cdot a_N$.

Figure 7B:
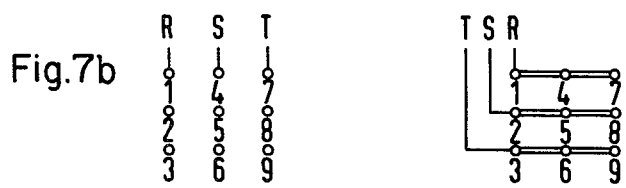
Figure 7C:
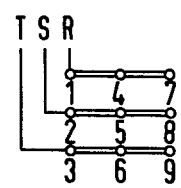

With the designations U, V, W, reference is made to the correlation with the three phase windings at the first pole pair number $p_1$. Now, nine instead of six terminals, as before, are required. In FIGS. 7b and 7c, connection schemes are shown, where for $2p_1$ there is a delta connection with a parallel zero branch and for $2p_2$, a triple delta connection with G/3 base winding branches, respectively, and the zero branch short circuited, i.e., ineffective.

Figure 8:
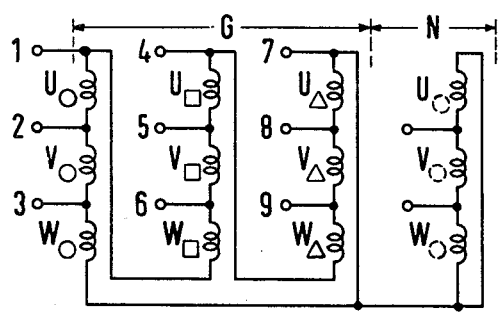

If, conversely, $p_2 \gg p_1$, e.g., for 4/18 poles, the winding branches can be connected as per FIG. 8. The zero branch, the coils of which are made with the same number of turns $w_{N(II)}$ as for the multiple star switching schemes with six terminals, requires two additional terminals. In the high pole stage, the connection is made to the terminals 1, 4 and 7 where only the delta connected base winding carries current, and the short circuited zero branches are ineffective. For low pole operation, the system connections are made to 1, 2 and 3, and for a quadruple delta connection, eight bridge connectors between the terminals 1-4-7, 2-5-8-10 and 3-6-9-11, respectively, are required. If the zero branches are omitted, according to a variant discussed later on, or if a supplemental winding is arranged instead which is connected parallel to the base winding for the pole pair number $p_2$ which is divisible by three, then the circuit is simplified to nine terminals as in FIG. 7.

Figure 9:
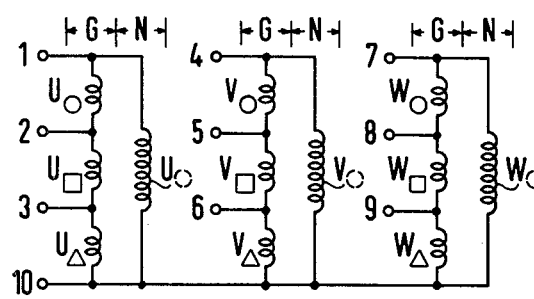

With ten terminals, Y/triple delta switching of the base winding can also be realized, as is shown, in analogy to FIG. 7, in FIG. 9 for $p_1 \gg p_2$. Terminal 10 is necessary in the second pole number stage with $p_2 = 3n$, in order to close the triple delta connection in conjunction with the bridge connector 1-4-7. With an inverse pole number ratio with $p_2 \gg p_1$ and a Y/quadruple delta connection, two additional zero branch terminals are required, analogously to FIG. 8.

In Table II, the numbers of terminals required and the then obtained turns ratios for parallel connected zero branches are compiled.

In all cases, an outer series connection with connection to the delta points of the base winding could also be provided instead of the parallel connection of the zero branches made in FIGS. 7 to 9. In the schematic of connections as per FIGS. 7b and 7c, the zero branches must then be inserted between R, S, T and the terminals 1, 4 and 7 respectively the terminals 1, 2 and 3 and a total of 12 terminals are required. The zero branches then carry $\sqrt{3}$ times the phase current, so that their coils require a number of turns reciprocally reduced to $\sqrt{3}/3$. Because of the phase of these currents which is shifted $\pi/6$, it is advisable to design the zero branches as per FIG. 10b in such a manner that their axes are likewise shifted $\pi/6$.

FIG. 10c shows, as a schematic example the phase band axes U, V, W of the three phases, a non-interspersed, $\pi/3$ phase band spreaded winding for the first pole number $2p_1$, each phase band of which represents G cophasal base winding branches. The latter are formed, for instance, in the case of the phase U, of different parts of the upper (odd numbered) and the lower (even numbered) winding phase bands, as is seen from the subdivision of the winding phase bands indicated in FIG. 1 in accordance with FIG. 3. Two possibilities for the required combination of the $\pi/6$ phase shifted zero branches suitable for the outer series connection for a base winding in delta connection according to FIG. 10b are shown in FIGS. 10d and e.

According to FIG. 10d, the zero branches are arranged in three $2\pi/3$ spreaded phase bands, two immediately adjacent subbands always being combined in a zero branch zone. In the subbands (−U, −V, −W), normally carrying negative current of the three phases, the flow direction is reversed here.

If each of the subbands is divided in half, a six phase band $\pi/3$ spreaded zero branch arrangement can also be obtained as per FIG. 10e. However, the number of different phasal coil sides per subband must be even for this purpose.

In a similar manner, the zero branches can be designed for $2\pi/3$ spreaded phase bands and/or phase interspersed winding arrangements for the first pole number $2p_1$.

Figure 11A:
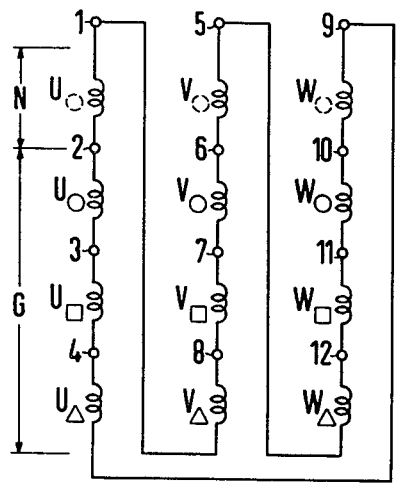
FIGS. 11a, b, c and 12a, b, c show different circuit diagrams for delta/triple delta or Y/delta switching always with equal winding coils and zero branches inserted in an inner series connection.
Figure 11B:
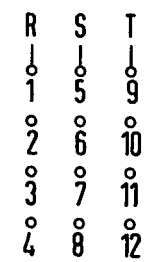
Figure 11C:
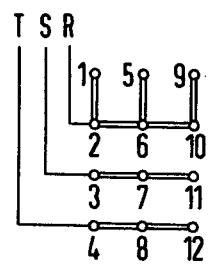
Figure 12A:
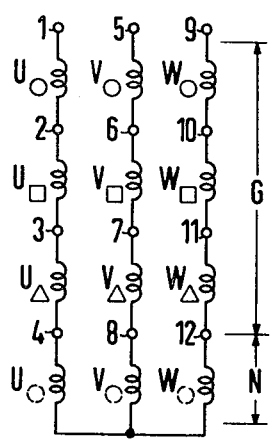

With a total of 12 connecting terminals, an "inner" series connection of the zero branches can also be made, as is shwon in FIG. 11 for delta/triple delta and in FIG. 12 for Y/triple delta switching. For this purpose, all winding coils are constructed completely identical and the zero and base winding branches are grouped with equal phases. These two circuits are particularly well suited if the first pole number $2p_1$ is very much larger than the second pole number $2p_2$, which is divisible by three. Because of the zero branch series connection, the turns ratio $w_1/w_2$ is increased $(1 + N/G)$ times.

Figure 12B:
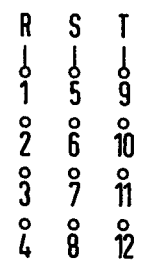
Figure 12C:
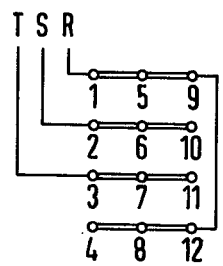

The connection schematics for the high first pole number $2p_1$ are shown in FIGS. 11b and 12b, and the bridge connectors required for changing to the low second pole number $2p_2$ can be seen in FIGS. 11c and 12c. The respective zero branches are then short circuited.

Besides the integral slot windings considered in the explanation of the basic principle, fractional slot windings can also be realized. Since in integral slot windings the arrangement of coil sides is repeated after every pole, it is sufficient to consider only the zone axes, according to FIG. 2, in determining the phase present at the other pole number. When supplemented to form the coil side star, each vector in the star of the zone axes represents a symmetrical bundle of vectors with a number of coil sides corresponding to the number of slots $q_1$. In contrast thereto, the winding zones in fractional slot windings are formed alternatingly of a different number of coil sides, the arrangement being repeated only after U pole pitch divisions, where U is the so-called "master scheme" of the winding. The fractional slot number $q$ is a fictitious number which indicates the mean value of the alternatingly different coil side numbers per pole and phase. The phase band axes alone no longer suffice for judging the symmetry of the coil-side star, particularly if the first pole pair number $p_1$ is an odd number.

As was already explained for a doubly odd numbered pole pair number ratio, partial zone arrangements with a coverage extent over $2\pi/3$ are necessary for an odd first pole pair number $p_1$:

Table III contains a compilation of these cases. The spreads and extent of the winding phase bands given relate, in the case of fractional slot windings, to the resulting $2p_1$ pole coil side star. For non-interspersed integral slot windings, the phase band spread and the extent are identical. The extent of the winding phase bands can be enlarged arbitrarily by interspersing the phases. Important special cases are those interspersed phase arrangements, in which winding phase bands $\pi/3$ spread are fanned out over exactly twice the area of $2\pi/3$. Such winding arrangements are more advantageous, for instance, for a doubly odd numbered pole number ratio than $2\pi/3$ spreaded windings, since they do not generate undesired even harmonics.

According to Table III, winding phase bands which extend over $2\pi/3$ are necessary for odd first pole pair numbers $p_1$. For a doubly odd numbered pole number ratio, this holds generally since, otherwise, according to FIG. 2b, there would be too little phase band spreading $\beta/\alpha'$.

Odd first pole pair numbers $p_1$ are either prime numbers $(p^*)$ or products of several prime numbers which are larger than three. In view of the necessary subdivision into several cophasal winding branches for the base winding and zero branches, only half slot windings with $q_1 = Z/2$ are realizable in the case of prime numbers for $p_1$, and it is necessary for obtaining uniform and triaxially symmetrical coil side stars, to provide double spreaded $(2\pi/3)$ winding phase bands. A similar situation prevails for slot numbers $q_1 = Z/2p^*$ if $p_1$ is a product of prime number $p^*$ larger than three.

Taking into consideration that for both pole numbers regularly realizable slot numbers $q_1$ and $q_2$, i.e., the slot numbers per pole and phase, must be available, one obtains as the necessary minimum number of slots $Z_N =$
$18 \times p_1 \times u/t = 9(G + N) \times u/t$
for $n \neq 3k$, i.e., for $p_2 = 3, 6, 12, 15 \ldots$ etc.
and $$Z_N = 54\, p_1 \times u/t = 27\, (G + N) \times u/t$$

for $n = 3k$, i.e., for $p_2 = 9, 18, 27, \ldots$ etc. The latter equation results from the limited realizability conditions of windings with $p_2 = 9k$, where only fractional slot numbers with $q_2 = Z/2k$ are possible.

The factor $u$ in both equations must be substituted if $p_1$ and $p_2$ can be cancelled, i.e., if $p_1 = u \times p_1'$ and $p_2 =$ $u \times p_2'$. This means that a winding arrangement which can be changed in the ratio $p_1':p_2'$ is repeated u times along the circumference.

The equations for the minimum slot numbers given can be derived, for instance, from the coil side star for $p_2 = 3n$ as per FIG. 3. The aperture angles $\phi$, $\Psi$ of the sectors occupied by the base winding and zero branches show dependence on the chosen subdivision of the winding branches as $G/N = \phi/\Psi$ with $\phi + \Psi = 2\pi/3$.

The smallest winding element is a single coil, which appears as a vector in the coil side star. Depending on the chosen division into base winding and zero branches, a minimum number of uniformly distributed vectors corresponding to $3 \times (G + N)/t$ is required. Since the number of the vectors corresponds to the upper layer coil sides, which are distributed as to phase over the entire circumference, of a single phase winding, the minimum number of slots must be three times that i.e., $9(G + N)/t$ for $n \neq 3k$.

The numbers of slots $27(G + N)/t$, again increased threefold for $n = 3k$, i.e., $p_2 = 9, 18, 27$ etc. are necessary in order to avoid one third, sixth etc. slot windings, which are not regularly realizable.

In Table IV, a number of practically realizable pole pair number ratios with pole pair spreads $p_1:p_2$ or $p_2:p_1$ to about three are listed. Winding arrangements which repeat several times along the circumference, are given as numerical values $u(p_1'/p_2')$, with u as the multiplication factor. The areas designated with I relate to odd-/even numbered pole pair number ratios which can be realized with $\pi/3$ spreaded phase bands. If here, the first pole pair number is a prime number $(p_1^*)$, then winding phase bands $\pi/3$ spreaded can be realized only with integral slot windings according to Table III. With half slot windings and doubly odd numbered pole pair number ratios designated with II, windings with phase band coverages of twice the spread $(2\pi/3)$ must be provided. The pole pair number ratios marked with a — sign are not realizable.

For windings which can be changed to second pole numbers $2p_2 = 6, 12, 18$ and $24$, Table V contains a compilation of the necessary minimum number of slots. For the division into base windings and zero branches, those values for G and N according to Table I are selected which have the largest common denominator $t$. The underlined examples require for the first pole pair number $p_1$ a winding arrangement with phase bands $2\pi/3$ spreaded. Here, however, $\pi/3$ spreaded phase band windings can also be realized for even second pole pair numbers $p_2$ and a doubled number of slots. Realizable higher slot numbers are obtained by multiplying the minimum number of slots given or by selecting another subdivision into base winding and zero branches as per Table I. Thus, the next larger possible number of slots for a 20/18-pole winding is $Z_N = 27 \,(3 + 2) = 135$, for instance, with a division $G:N = 3:2$.

It is clear that with increasing pole numbers, the necessary minimum numbers of slots also increases. Particularly large slot numbers are obtained with second pole pair numbers $p_2 = 9, 18, 27$ etc. and likewise if the first pole pair number $p_1$ is a pure prime number $(p_1^*)$, as only values not in the denominator or that can be halved, are involved here for G and N.

The situation is different, however, for odd first pole pair numbers $p_1$ which are a product of two prime numbers $(p^*)$ larger than three, i.e., for $p_1 = 5 \times 5 = 25$ $p_1 = 5 \times 7 = 35$ $p_1 = 7 \times 7 = 49$.

Here, fractional slot numbers with double the prime number divisors in the denominator are possible, so that, for instance, a 50/48 pole, changeable winding can be realized already with $Z_N = 45$ slots and a division of the winding branches with $G = 30$ and $N = 20$. By doubling the number of slots to $Z_N = 90$, the groupings of windings with phase bands in the coil side star $\pi/3$ spread and a division with $G:N = 9:1$, i.e., $G = 45$ and $N = 5$ then become possible.

In FIG. 13, a winding that can be changed for 10/6 poles for a required minimum number of slots $Z_N = 45$ and a division $G:N = 3:2$ is shown. For this, an original grouping with a winding phase band $2\pi/3$ spread is necessary, for which the upper layer coil sides of the $2p_1 = 10$ pole phase winding are shown in FIG. 13a. Underneath, the phase band axes for the second pole number $2p_2 = 6$ are shown in FIG. 13b. According to FIG. 13c two different 6-pole groupings $\alpha$, $\beta$ for a division $G:N = 3:2$ are possible. The correlation symbols to the individual winding branches given above the coil sides in FIG. 13a optionally apply for this purpose.

The grouping $\alpha$ corresponds to the phase band arrangement shown in FIG. 3; grouping $\beta$ is a symmetrically interspersed variant with triply divided and fanned out base winding phase bands (one coil side each). The zero branch subsectors ①and ②formed by a respective coil side lie in between. Contrary to the complete, sectorial presentation in FIG. 3, FIG. 13c shows only the respective region of one base winding phase band with the spread $\phi$ and the immediately adjacent zero-branch subsectors with a total spread $\Psi$ in a linear development, i.e., a total of only one-third of the $2p_2$ pole phase band plan.

For mutual equalization of the flux densitites in the air gap, a series connection of the zero branches is recommended as per FIG. 6.

Depending on the coil pitch, the winding factors and flux density relations shown in Table VI are obtained. The associated m.m.f. polygons are shown in FIGS. 13d and 13e. For the chosen minimum slot number $Z_N$ 32 45, the pole pitches are $\tau_6 = 7.5$ slots and $\tau_{10} = 4.5$ slots. If the coil-span 1 to 8 $(W = 7)$, which comes closest to $\tau_6$, were chosen, then the coils would have far too long a chord for the other pole number with $W/\tau_{10} = 7/4.5 = 1.56$ and therefore, the winding factor $\tau_{10}$ would be very small. It is therefore more advantageous to shorten the coil-spans down to 1 to 7 or 1 to 6 $(W = 6$ or $W = 5)$.

As both pole pair numbers $p_1$ and $p_2$ are odd numbers, one could also choose a span 1 to 23 $(W = 22)$. This would correspond to one-half the machine circumference and would provide the smallest possible chording for both pole numbers, as then the coil pitch W of three times the pole pitch $(3\tau_6)$ for $2p_2 = 6$ or of five times the pole pitch $(5\tau_{10})$ for $2p_1 = 10$ would deviate in each case only by half a slot pitch. However, such a winding would have relatively long end winding overhand.

In FIGS. 13d and 13e, groupings $\alpha$ and $\beta$ for $W = 6$, $W = 5$ and $W = 7$ as well as polar diagrams of the m.m.f. curves (Goerges polygons) for $W = 22$ are shown for $2p_1 = 10$ as well as for $2p_2 = 6$. The corresponding values of the winding factors and flux density ratios $B_6/B_{10}$ are listed in Table VI.

It can be seen from the non polar-symmetrical Goerges polygons according to FIGS. 13d and e that even numbered harmonics appear at the minimum slot number $Z_N = 45$, which can be avoided if the number of slots is doubled, $Z_N = 90$. For this purpose, two windings can be interspersed according to FIG. 13a in such a manner that the coil sides of the one winding (one half) always occupy the odd numbered slots and the coil sides of the other winding (other half) always occupies the even numbered slots, the two halves being offset by one-half the circumference of the machine and carrying current in opposite directions.

Figure 14A:
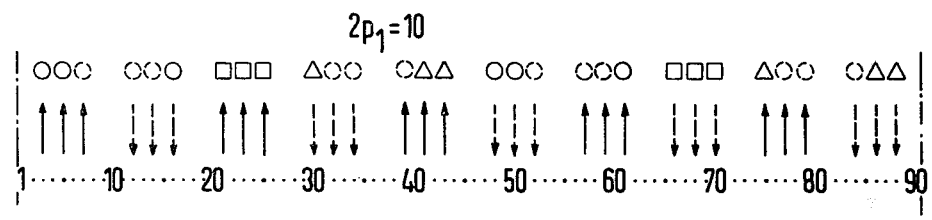

This winding is indicated in FIG. 14, the coil sides of the second half being shown in dashed lines. The assignment to the winding branches is made in accordance with variant α in FIG. 13c. Thus, one obtains a symmetrically phase interspersed $\pi/3$ phase band spreaded winding with twice the phase band coverage. For a coil pitch $W = 10$ (span 1 to 11), the winding factors and the flux density ratios are identical with the values in Table VI for span 1 to 6, grouping α (1st line).

If the coil pitch is increased to $W = 11$, one obtains $\xi_{10} = 0.793$ $\xi_6 = 0.861$ and $B_6/B_{10} = 0.921$.

Figure 14B:
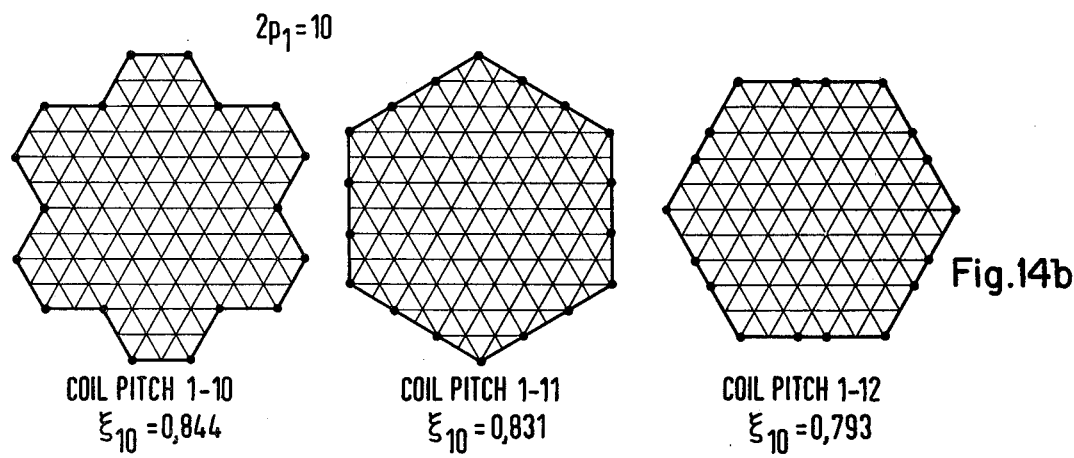
Figure 14C:
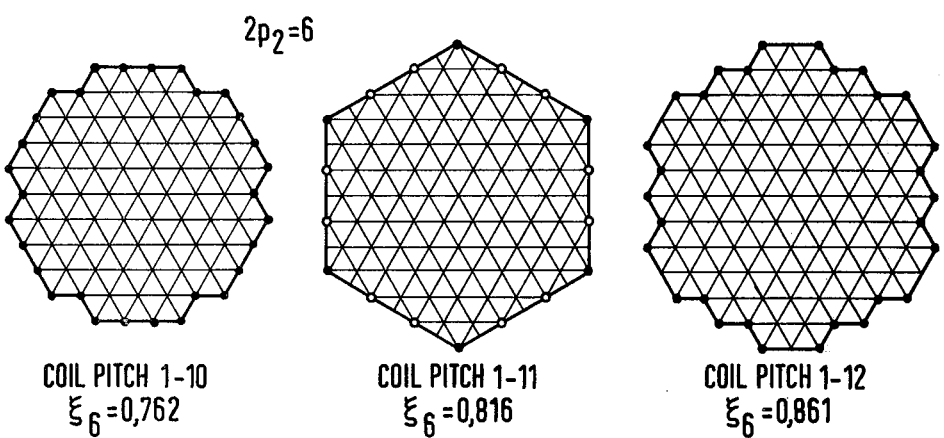

If the coil pitch is decreased to $W = 9$, one obtains $\xi_{10} = 0.844$, $\xi_6 = 0.762$ and $B_6/B_{10} = 1.11$, where in both cases an unchanged series connection of the zero branches according to FIG. 6 is assumed. The corresponding m.m.f. curves for $W = 10$ (Goerges polygons) are also shown in FIGS. 14b and 14c. It turns out that they have six axis mirror symmetry for both pole numbers, independently of the coil pitch, which is due to the phase band coverage which was doulbed to $2\pi/3$.

Figure 15A:
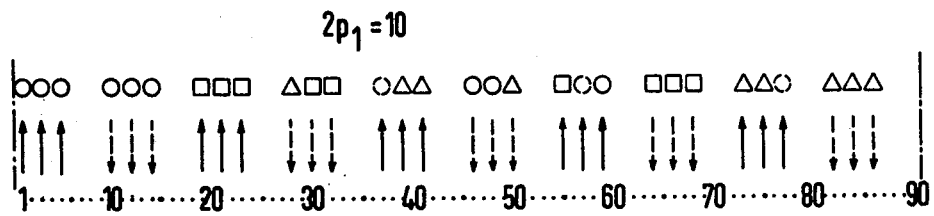
Figure 15B:
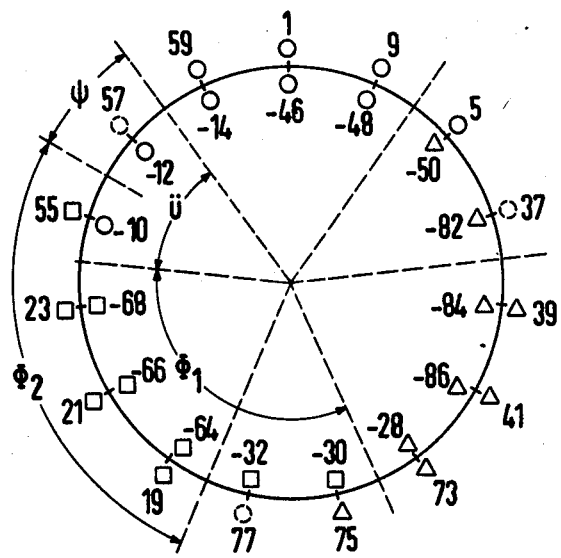

The winding phase bands which are fanned out to $2\pi/3$ by said phase interspersing, permit an unlimited number of cophasal winding branches, so that such a 10-pole winding for $Z_N = 90$ slots can also subdivided, according to FIG. 15a, in the ratio $G:N = 9:1$. FIG. 15b shows the corresponding coil side star for $2p_2 = 6$. There, the coil sides of the first subsystem located in odd numbered slots are shown outside the circle, and the coil sides of the second subsystem inside the circle with negative direction of the current.

In Table VII, the winding factors and flux density ratios obtained for different coil pitches are compiled with reference made to the associated Georges polygons. The zero branch can optionally be connected parallel to or in series with the base winding branches. For a parallel connection as per FIG. 4, the zero branch coils must be made with three times the turns as the coils of the base winding branches, while for series connection, they require only one-third of the turns of the coils of the base winding branches. The corresponding Goerges polygons are shown for 6-pole operation in FIG. 15c. They exhibit triaxial periodicity. For the 10-pole stage, the polygons remain six-axially symmetrical as per FIG. 14c.

According to FIG. 15b, the same number of coil sides is always assigned to the individual winding branches of each subsystem (phase winding halves with coil sides drawn solid and dashed in FIG. 15a), and specifically, five each of the base winding (sector $\phi_1$) as shown inside the circle and four of the base winding, lying outside the circle, as well as one coil side to the zero branch (sectors $\phi_2$ and $\psi$). In analogy with FIG. 3, we have here $G/N = (\phi_1 + \phi_2)/\psi$. Because of the cophasality of both subsystems, different subdivisions can also be realized. In the overlap sectors $u$, the assignment of individual coil sides can be interchanged, e.g., 55 and $-10$ or 57 and $-12$, without thereby changing the winding factors $\xi_6$ and $\xi_{10}$.

Figure 15C:
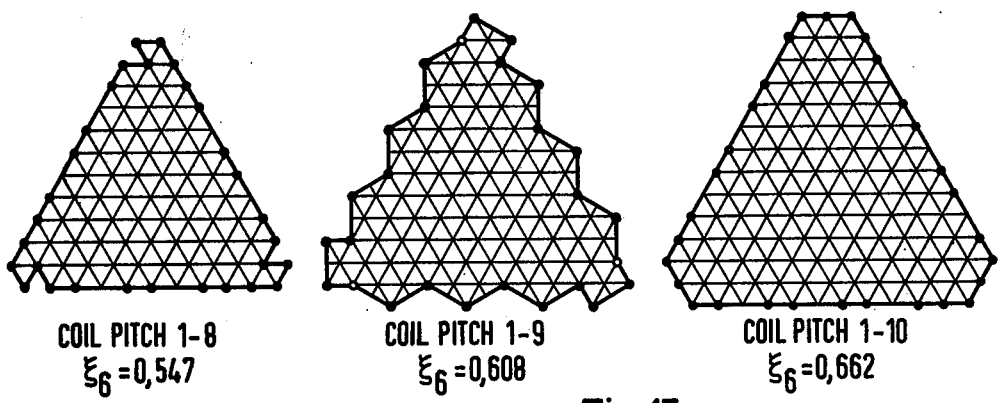

However, this will influence the field harmonics and the phase symmetry in 6 pole operation, so that the triaxial periodicity existing according to FIG. 15c is lost and the Goerges polygons overall become more irregular.

As a further example, there are shown for a winding changeable from 10 to 12 poles, the upper layer coil sides of a 10 pole phase winding for $Z_N = 90$ slots in FIG. 16a for conventional winding phase band $\pi/3$ spread, and for phase interspersed winding phase bands fanned out to a coverage of $2\pi/3$ in FIG. 16b. The association with the individual winding branches indicated by the correlation symbols results, in the 6 pole coil side star, in the same grouping with sector spans $\phi = 180°$ and $\psi = 12°$ in both cases, according to the chosen division ratio $G:N = 9:1$.

In Table VIII, the corresponding winding factors and flux density relations are indicated for coil pitches $W = 7$ and $W = 8$, for a selectable parallel or series connection of the zero branch. The two coil pitches differ from the pole pitch $\tau_{12} = 7.5$ only by half a slot pitch, so that winding factors $\xi_{12} = 0.855$ equal throughout are obtained.

From the Goerges polygons according to FIGS. 16c and 16d it is seen that the initial grouping according to FIG. 16b has considerably fewer harmonics and better winding symmetry in 12 pole operation (FIG. 16d). Here, the polygon trains have triaxial symmetry and are more compact. The polygon lines according to FIG. 16c, on the other hand, have only single axis symmetry and the inner and outer polygon loop are relatively far apart. The single axis symmetry only indicates differently grouped phase windings. In all cases, the polygons are closed only after two revolutions, which indicates that a subharmonic of half the number of poles is excited.

For a change 14/12 winding, the upper layer coil sides of a phase for $2p_1 = 14$ with winding phase bands $2\pi/3$ spread are indicated in FIG. 17a. With the chosen minimum slot number $Z_N = 63$, the slot numbers are $q_{14} = 1.5$ and $q_{12} = 1.75$ per pole and phase. The given correlation between the coil sides and the individual winding branches are found by means of the 12 pole coil side star in FIG. 17b, where $G:N = \phi : \psi = 6:1$ is fixed for the division into base winding and zero branches.

The zero branch can be connected parallel or in series to the triple Y/triple Y connected base winding. The parallel connection then requires coils with twice the number of turns as the base winding branches.

For coil pitches of $W = 5$ and $W = 4$ (corresponding to $\tau_{14} \pm 1/2$), the numerical values entered in Table IX are obtained as well as the Goerges polygons shown in FIGS. 17c and d, where $2p_1 = 14$ the case with the zero branch omitted is also shown.

By doubling the number of slots to $Z_N = 126$, the even numbered field harmonics of the two pole numbers (lacking polar symmetry in the Goerges polygons) as well as the subharmonics for $2p_2 = 12$ (spacing of the polygon lines) can be reduced considerably if a phase interspersed original grouping with twice the phase band coverage is provided. In FIG. 18a, the spatial position of the coil sides of a 14 pole phase is shown, and in FIG. 18b, the corresponding coil star for $2p_2 = 12$. The even numbered coil sides shown outside the circle are positive current carrying, and the others negative current carrying. The axes of the two subsystems are shifted relative to each other by an angle $\delta = \alpha_N/2 = 60°/7$, corresponding to one half a slot pitch $\alpha_N$.

In comparison with the values in Table IX, the winding factors $\xi_{12}$ are thereby reduced cos $\delta/2$ times for an equal relative coil pitch. It is also possible to choose the angle larger, e.g., $\delta = 3\alpha_N/2$. The coil sides which carry negative current and are shown dashed in FIG. 18a, are then assigned differently to the individual branches. With $\delta = 3\alpha_N/2$, for instance, this assignment is the same for succeeding winding phase bands in pairs, i.e., the coil sides 11, 13, 15 are then correlated in the same order as the coil sides 2, 4, 6 to the individual branches and likewise the coil sides 29, 31, 33 as 20, 22, 24, etc.

The m.m.f. polygons applicable to a winding as per FIGS. 18a and 18b are shown in FIGS. 18c and 18d for coil pitches of $W = 10$ and $W = 9$. The substantially improved field shape is evident if the polygons for the span 1 to 11 is compared with those for the span 1 to 6 in FIGS. 17c and d. In both cases, the relative coil pitch is the same:

$$W/\tau_{14} = 10/9, \text{ and } W/\tau_{12} = 20/21.$$

Figure 19A:
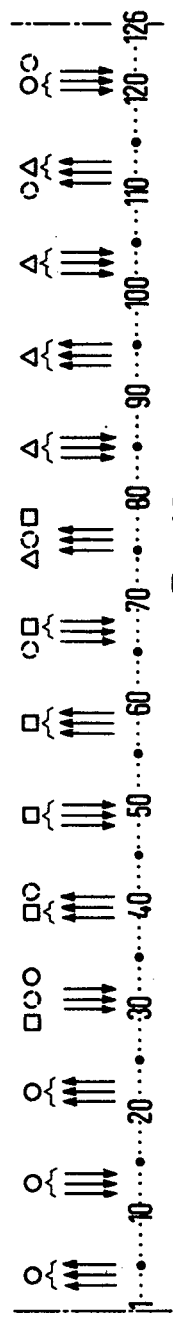
Figure 19B:
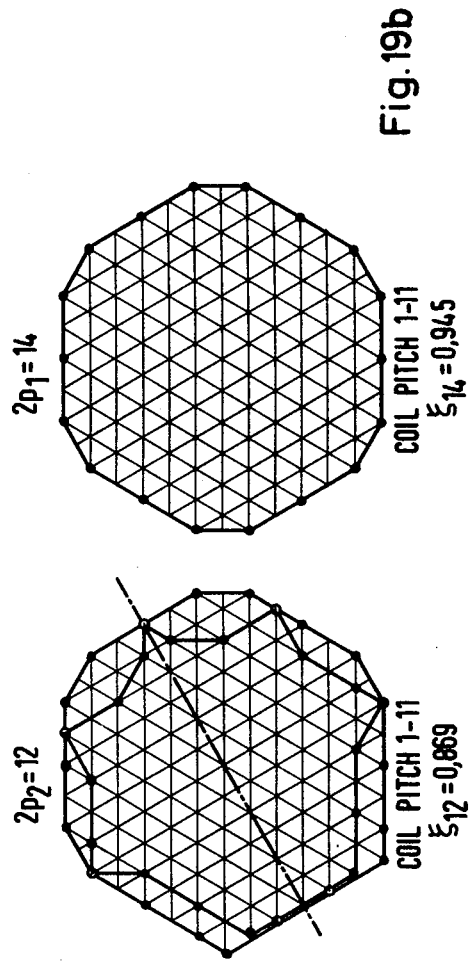

For a number of slots $Z_N = 126$, $q_{14} = 3$ and $q_{12} = 3.5$. For the first pole number $2p_1 = 14$, a conventional $\pi/3$ spread phase band arrangement can also be realized therefore, as is shown in FIG. 19a. While the winding factor $\xi_{14}$ is higher than, the field shape for 12 pole operation is less favorable. As with the 12/10 pole winding as per FIG. 16a and FIG. 16c, the corresponding Goerges polygon as per FIG. 19b is now only single axis symmetrical. The two m.m.f. polygons in FIG. 19b for 14 and 12 pole operation apply for a coil span from 1 to 11.

In Table X, the flux density ratios, winding factors and references to field shapes for different coil pitches are compiled.

In the embodiments described in connection with FIGS. 13 to 19, the nine branches of the base winding are connected triple Y throughout, so that the number of turns is the same in both stages. Possible adaptations for the number of turns effective for both pole numbers can be realized by phase interspersing, changing the coil pitch as well as by optionally connecting the zero branch parallel or in series for the first pole pair number $p_1 = 3m \pm 1$.

For large pole number spreads and/or for blower motors it is advantageous to provide for the base winding delta/triple delta or Y/triple delta switching, where the zero branch, the number of turns of which is designed accordingly, can be connected to the base winding in accordance with FIGS. 7 to 12 parallel or with an inner or outer series connection. As an example for this, a 20/6 pole winding for $Z_N = 72$ slots is shown in FIGS. 20 to 23. FIG. 20a shows the spatial position of the upper layer coil sides belonging to the phase winding U for the first pole number $2p_1 = 20$ which are, according to the fractional slot number $q_1 = 72/3 \times 20 = 1.2$ present in this case, distributed over the individual poles as per the grouping scheme 1-1-1-1-2. Underneath are shown the phase band axes for the second pole pair number $2p_2 = 6$ (FIG. 20b), by means of which the assignment, given in FIG. 20a, to the individual winding branches is found in accordance with FIG. 20c.

The phase of the individual coil sides for both pole numbers can be seen from the coil side stars in FIG. 20d for $2p_1 = 20$, and in FIG. 20e for the second pole number $2p_2 = 6$. In each case, this is a non-interspersed phase band arrangement as per FIG. 1 and FIG. 3, the subdivision into base winding and zero branches being $G:N = \phi : \psi = 3:1$.

The coil pitch is fixed advantageously as 1 to 13, 1 to 12 or 1 to 11. In the first case, it then corresponds exactly to the pole pitch $\tau_2$ and is always close to three times the pole pitch for $\tau_1$ ($3\tau_1 = 3 \times 3.6 = 10.8$).

The large winding factors $\xi_{20}$ and $\xi_6$ always present here are given at the head of Table XI. Depending on the circuit and the design of the zero branches, the cited induction ratios $B_{20}/B_6$ are obtained in the air gap. The respective turns ratios and the required numbers of turns of the coils for the zero branches are also given. For the series circuit, the linkages of the coils and the current densities, respectively, are assumed to be constant throughout. In principle, numbers of coil turns $w_N$ deviating therefrom are also possible, however. Likewise, the zero branches can be omitted.

Figure 21A:
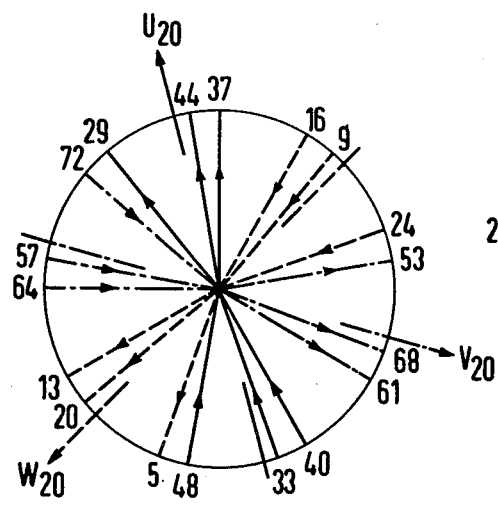
Figure 21B:
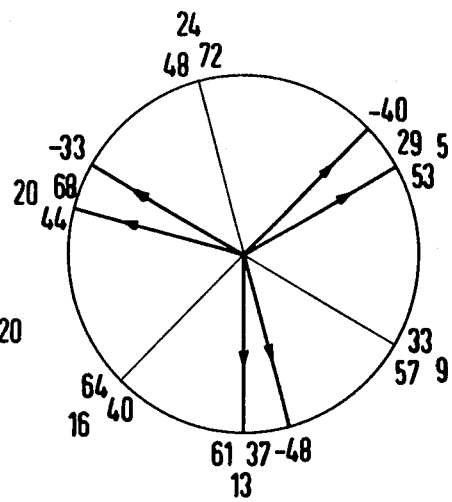

The coil correlation given in FIG. 20 has zero branches which are cophasal with the base winding. In FIG. 21, all the coil sides belonging to the zero branches are shown again, FIG. 21a applying for the first pole number $2p_1 = 20$ and FIG. 21b for the second pole number $2p_2 = 6$. As is evident from FIG. 21b, the induced voltages add up to zero in 6 pole operation, so that then the zero branches have no voltage and can therefore be short circuited.

Figure 22A:
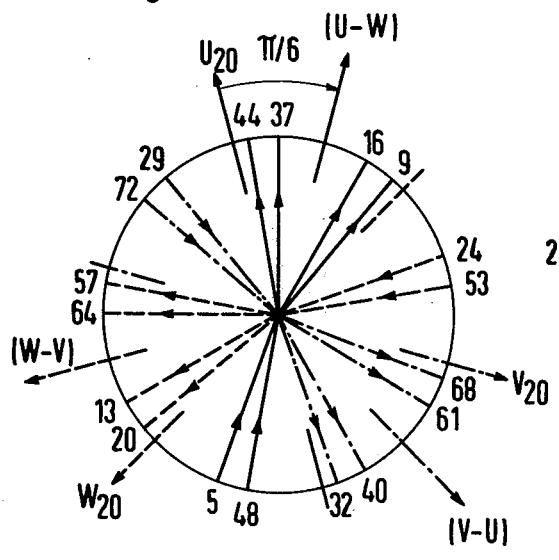
Figure 22B:
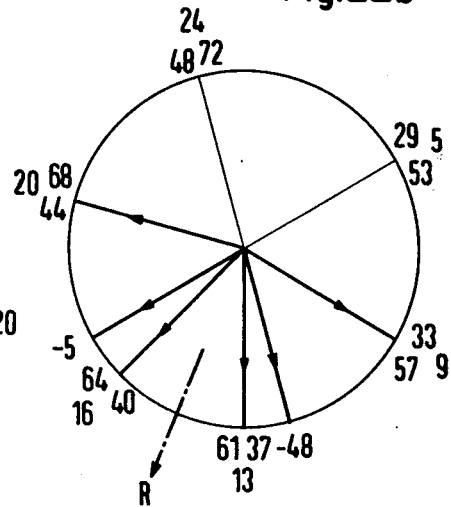
Figure 23A:
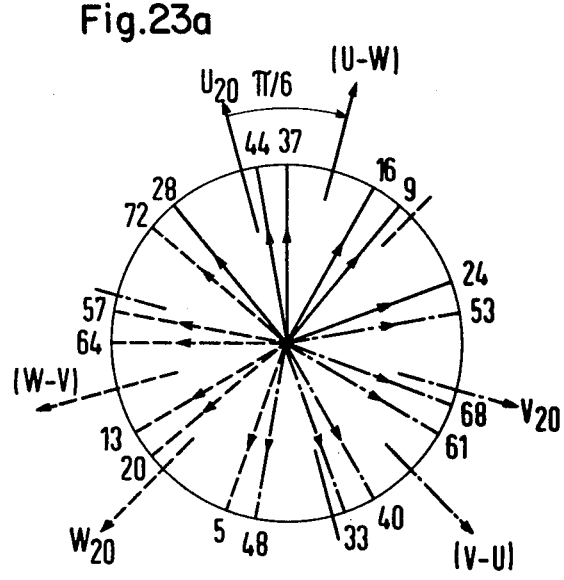
Figure 23B:
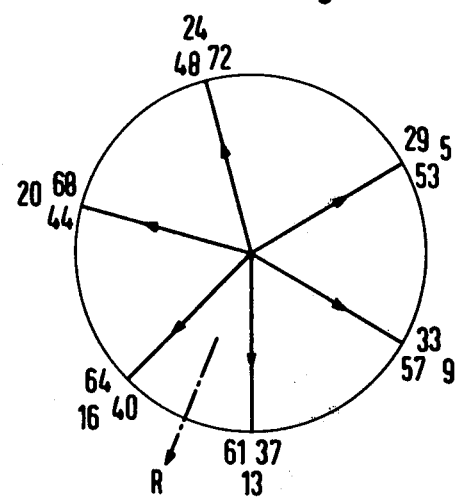

In contrast thereto, this is not the case with the zero branches provided for an outer series connection according to FIGS. 22 and 23. As is seen from FIGS. 22b and 23b, residual voltages pointing in the direction of the resultant R remain in 6 pole operation. Since they are of the same magnitude for all three phases, the outer zero branch terminals can be tied together, but a short circuit between the beginning and the end of the zero branches must be avoided. For the first pole number, the respective zero branch coils are combined so that the zero branch axes are always shifted $\pi/6$ relative to the phase axes of the base winding. Drawn with solid lines are shown the respective zero branch coils for (U - W), a $\pi/3$ spreaded phase band zero branch arrangement according to FIG. 10e being given in FIG. 23a and a $2\pi/3$ spreaded phase band zero branch design according to FIG. 10d in FIG. 23a.

The number of variants possible by phase interspersing for the first pole number $2p_1$ understandably increases steeply with increased numbers of slots. Table XII is intended to show this by the example of a $\pi/3$ spreaded phase band three phase winding with $q_1 = 6$ slots per pole and phase. Under a to l, differently interspersed phase band groupings for the $2p_1$ pole stage are listed, all of which are suitable for pole changing according to the present invention and which can be transferred into identical $2p_2$ pole groupings according to FIG. 3 or interspersed modifications thereof. In the right hand column, the respective associated distribution factors are given.

All of the groupings $a$ to $g$ are symmetrical, but the groupings $h$ to $l$ are asymmetrical. As indicated in Table XII by dots and circles, the variants $h$ to $k$ are obtained by arranging, for instance, in the odd numbered slots, an interspersed and in the even numbered slots a non interspersed subgrouping for half the number of slots $q_1' = 3$ and arranging these windings, which are each subgrouped symmetrically by themselves, shifted by one, three or five slots. Variant 1 follows directly from a possible asymmetrical grouping for $q_1' = 3$ by doubling the number of slots.

In the case of the symmetrical groupings, the variants $a$, $b$, $c$ and $f$ can be thought of as being produced from two non interspersed subgroupings shifted by 1, 3, 5 and 7 slots, and the variants $d$ and $e$ of two symmetrical subgroupings of half the number of slots, which are interspersed for twice the coverage ($2\pi/3$) and are offset by 1 or 3 slots.

In Table XII, the number of phase band groupings possible with $q_1 = 1$ is by no means complete. By always combining an asymmetrical subgroup with symmetrical groupings for half the number of slots $q'_1 = 3$, which are always arranged shifted by the angle $\delta$, still other asymmetrical interspersing schemes can be obtained (Table XIII). Further symmetrical phase interspersing schemes, which can be obtained from asymmetrical subgroupings, combined with mirror symmetry, for $q'_1 = 3$, are shown in the lower part of Table III.

All these interspersing schemes according to Table XII and XIII can also be realized for 20/6 pole winding for $Z_N = 72$ slots with $q_1 = 6/5$. The phase band distributions shown are, however, then obtained only in the sum over 5 respective poles (see FIG. 20d), which corresponds to a non interspersed arrangement according to Table XII, Variant $a$.

As already mentioned, interspersed phase band groupings are also possible with the second pole pair number which is divisible by three. Such can be formed with minimum slot numbers increased by the factor $k$ by $k$ mutually shifted elementary groupings.

For a division with $G:N = 3:1$, for instance, twelve such elementary sectors (30° /$k$) wide must be provided, as is indicated in the head of Table XIV, from which differently interspersed phase band arrangements can be derived. This elementary grouping corresponds to the basic arrangement according to FIG. 3 with $\Psi = \pi/2$ and $\psi = \pi/6$. Three adjacent elementary sectors with an electrical spread of (30° /$k$) belong to the same base winding phase band, the phase band distribution factor of which is therefore $$\xi'_Z = (1/3)(\cos 0° + 2 \cos 30°) = 0.9107.$$

The fourth sector is always assigned to the zero branch.

By mutually staggering $k$ such elementary groupings, the individual variants shown in Table XIV for $k = 2$ and 3 are obtained. With increasing mutual displacement of the elementary groupings, the distribution factor $\xi_Z$ gets worse and worse. The displacement factors $\xi_V$ due to the displacement angles between the individual elementary groupings are indicated in Table XIV.

Such interspersed groupings assume a sufficiently large number of slots per pole. While the non interspersed grouping according to FIG. 3 can be realized with the minimum number of slots $Z_N/2p_2 = 6$ slots per pole, the groupings according to Table XIV require $Z_N/2p_2 = 12$ slots per pole for $k = 2$. The variants $\alpha$ to $\eta$ for $k = 3$ as per Table XIV require at least $Z_N 2p_2 = 18$ slots per pole. In general, at least $Z_N/2p_2 = 6k$ slots per pole are required with a pole pair number $p_2 = 3n$ for an elementary grouping $k$ times subdivided and for a subdivision into base and zero branch windings in the ratio $G:N = 3:1$.

For other division ratios, particularly such with $N > 2$, the number of interspersings possible with $p_2 = 3n$ is further increased considerably. With $G:N = 3:2$, for instance, the two different elementary groupings $\alpha$ and $\beta$ given in FIG. 13c can be realized with the necessary minimum number of slots $Z_N = 45$. With larger numbers of slots, one can now obtain, with both, an avalanche-like increasing number of variants by interspersing and mutual combining.

By means of phase interspersing, it is possible to determine the effective turn numbers of both pole numbers independently of each other. Since the respective coil pitches can be left at the most favorable value $W = \tau_2$, this measure, contrary to changing the coil cords, is not accompanied by a degradation of the field symmetry (see Table XV). In view of a matched air gap induction, it is necessary that at the larger pole number, the higher effective number of turns is also present. One will therefore preferably use phase interspersing for the smaller pole number with multiple Y switching with parallel zero branches and only 6 terminals.

As can be seen from Table XV, the phase band spreads and coil pitches have a substantial effect on the field shape and symmetry with both pole numbers. As a symmetry criterion, the number Z of the periodicity axes of the Goerges polygon is given in each case, by which the order numbers of the field harmonics present are determined according to $\nu = kZ \pm 1$.

Figure 24A:
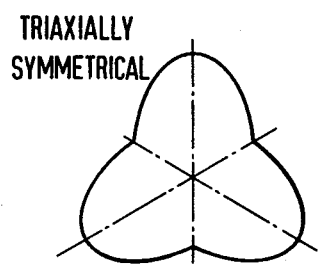
FIGS. 24a and 24b shows, in a simplified presentation, the difference between triaxially symmetrical and periodic Goerges polygons.
Figure 24B:
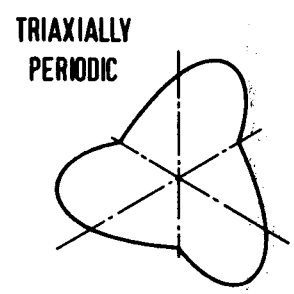

The difference between periodicity and symmetry becomes clear by reference to FIG. 24. Real examples of triaxially periodic polygons are those of FIG. 15c. Six axis periodic polygons are obtained for the first pole number $2p_1$ and asymmetrical phase interspersings. In the case of six axis polygons, periodicity is equivalent to polar symmetry. $\pi/3$ spreaded phase band windings which are not interspersed or symmetrically phase interspersed, always exhibit six axis symmetry regardless of the coil pitch.

For the second pole number ($p_2 = 3n$), only the base winding is effective. Due to its three phase band winding configuration, no even numbered field harmonics occur only if a diameter pitch is used, relative to $2p_2$. For different pitches and original windings with winding phase bands $\pi/3$ spreaded, at $p_1$, the Goerges polygon for $p_2$ normally becomes symmetrical for only one axis.

If the zero branches are omitted or connected in series and are phase shifted and/or have different coil linkages, the field shape gets worse and subharmonics appear. The Goerges polygon is closed only after several loops and the number of remaining symmetry axes is halved.

An important special case exists for phase interspersed original groupings with $2\pi/3$ phase band coverage. Those lead to triaxial symmetry for an even $p_1$, as is always the case with original three phase band windings. For a double odd pole number ratio, the winding can be subdivided, according to FIGS. 14 to 18, into two subsystems, each of which corresponds to a $2\pi/3$ spreaded phase band winding for half the number of slots. If the division into base winding and zero branches is made so that both subsystems are grouped identically and equiphasal, then 6 symmetry axes are obtained here too, regardless of the coil pitch (FIG. 14c). For a division, in which only the number of coils assigned to the individual winding branches by the first and second subsystem is constant, three symmetry or periodicity axes remain (FIG. 15c). For a different division, the symmetry is lost.

What is claimed is:

1. In a pole changeable three phase winding for a fractional pole pair number ratio of first and second pole numbers $p_1$ and $p_2$ which is $p_1:p_2 = (3m \pm 1):3n$ with $p_2 = 3n$ being an integral multiple of the number of phases, and $m$ and $n$ positive integers, the improvement comprising:
   (a) a total of $2p_1/t$ equal winding branches for each of the three phases, a number G divisible by three of said equal winding branches comprising base winding branches and the remaining number N of said equal winding branches comprising zero branches whereby a division into base winding branches and zero branches having the relationship $G + N = 2p_1/t$, where $t$ is an integral divisor of the first pole number is established;
   (b) means for establishing a connection of the three phases, for the first pole number $2p_1$, to the respective groups of G base winding branches;
   (c) means to couple the three phases to said G base winding branches for the second pole number such that one third of each of the G winding in each group is coupled to the same respective phase; and
   (d) said zero branches connected to said base winding branches such that they are ineffective at the second pole number $2p_2$.

2. The improvement according to claim 1, wherein the winding distribution is such that the coils belonging to a phase winding formed at the first pole number $2p_1$ by $2p_1/t$ same-phase winding branches are fanned out as to their phase at the second pole number $2p_2$, which is divisible by three, over the entire periphery of the coil side star without a gap and overlap.

3. The improvement according to claim 2, wherein the phase bands occupied by the base winding branches which at $p_1 = 3m \pm 1$ each form a phase, have a total spread of $\phi$ el. and the respective zero branch phase bands located in between have a total spread of $\psi$ el. with $\phi : \psi = G:N$ and $\phi + \psi = 2\pi/3$.

4. The improvement according to claim 3, wherein the base winding and zero branch phase bands are interspersed.

5. The improvement according to claim 4, wherein the interspersed grouping of the coil side star is composed of $k = 2, 3 \ldots$ mutually offset elementary groupings, where each elementary grouping is formed by elementary sectors following each other at spacings of $k$ each sector pitches, of which G elementary sectors always belong to the same base winding phase band an N elementary sectors to the zero phase band.

6. The improvement according to claim 1, wherein the coil sides of the base winding and zero branches belonging to a respective phase winding at the first pole pair number $p_1 = 3n \pm 1$ are phase interspersed.

7. The improvement according to claim 6, wherein said phase interspersing is such that for phase band spreads $\pi/3$, doubled phase band coverage to $2\pi/3$ is achieved.

8. The improvement according to claim 7 for an odd first pole pair number $p_1$, wherein said doubled phase band coverage is formed by two subsystems of one half the number of slots which are displaced relative to each other by one half the circumference and carry current of opposite directions, of which the one occupies the odd numbered and the other the even numbered slots and each has a non interspersed phase band arrangement with $2\pi/3$ spread, relative to one half the number of slots.

9. The improvement according to claim 8, wherein the coil pitch is an odd multiple of the slot pitch.

10. The improvement according to claim 8, wherein both subsystems are subdivided and assigned to the individual winding branches of the base and zero branch winding in the same manner.

11. The improvement according to claim 1, wherein the zero as well as the base winding branches each consist of coils with the same number of turns and with the same conductor cross section.

12. The improvement according to claim 1, wherein the G winding branches of the base winding are permanently connected, for the first pole number $2p_1$, in a triple Y connection to metallically separated neutral points which form the connecting points for the second pole pair number $2p_2$.

13. The improvement according to claim 1, wherein the G winding branches of the base winding are permanent delta connected for the larger pole number and can be switched to triple delta for the smaller pole number.

14. The improvement according to claim 1, wherein the G winding branches of the base winding are permanently Y connected for the larger pole number and can be switched to triple delta for the smaller pole number.

15. The improvement according to claim 12, wherein the N zero branches are permanently Y connected and are connected parallel to the base winding to the connecting points for the first pole number, said zero branches having a number of coil turns $w_N = (G/3N) \times w_G \times a_N$; where $w_G =$ number of coil turns in the base winding and $a_N =$ number of parallel zero branch paths that may be provided.

16. The improvement according to claim 13 for $p_1 << p_2$, wherein the N zero branches are permanently delta connected and are connected, for the first pole number $2p_1$, parallel to the triple delta connected base windings and the number of turns of the zero branch coils being $w_N = (G/3N) w_G \times a_N$; where $w_G =$ number of coils turns in the base winding and $a_N =$ number of parallel zero branch paths that may be provided.

17. The improvement according to claim 14 for $p_1 << p_2$, wherein the N zero branches are permanently delta connected and are connected, for the first pole number $2p_1$, parallel to the triple delta connected base windings and the number of turns of the zero branch coils being $w_N = (G/3N) w_G \times a_N$; where $W_G =$ number of coils turns in the base winding and $a_N =$ number of parallel zero branch paths that may be provided.

18. The improvement according to claim 13 for $p_1 << p_2$, wherein the N zero branches are permanently delta connected and are connected, for the first pole number $2p_1$, parallel to the likewise delta connected base winding and the number of turns of the zero branch coils being $w_N = (G/N) w_G \times a_N$, where $w_G =$ number of coils turns in the base winding and $a_N =$ number of parallel zero branch paths that may be provided.

19. The improvement according to claim 14 for $p_1 << p_2$, wherein the N zero branches are permanently y connected and are connected, for the first pole number $2p_1$, parallel to the likewise Y connected base winding, the number of turns of the zero branch coils being $w_N = (G/N) w_G \times a_N$; where $w_G$ = number of coil turns in the base winding and $a_N$ = number of parallel zero branch paths that may be provided.

20. The improvement according to claim 12, wherein the beginnings of the zero branches are connected directly to the respective ends, of the base winding branches which are each tied together to form a connecting point, and the ends of the zero branches form the connecting points for the first pole number.

21. The improvement according to claim 20, wherein the coils of the zero branches have a smaller number of turns and a larger conductor cross section than the coils of the base winding branches.

22. The improvement according to claim 20, wherein the coils of the zero branches differ with respect to number of turns and conductor cross section from those of the base winding branches by a factor of three.

23. The improvement according to claim 13 for $p_1 << p_2$, wherein the zero and base winding branches are directly connected in series in each phase winding and the three phases are delta or Y connected.

24. The improvement according to claim 23, wherein all winding coils of the zero and base winding branches have the same number of turns and the same wire cross section.

25. The improvement according to claim 14 for $p_1 << p_2$, wherein the zero and base winding branches are directly connected in series in each phase winding and the three phases are delta or Y connected 26. The improvement according to claim 25, wherein all winding coils of the zero and base winding branches have the same number of turns and the same wire cross section.

27. The improvement according to claim 13, wherein the beginnings of the zero branches are each connected directly to the delta points of the base winding and the ends of the zero branches form the connecting points for the first pole number.

28. The improvement according to claim 27, wherein the coils of the zero branches have a number of turns smaller by the factor $\sqrt{3}$ and a wire cross section larger by the same factor than the coils of the base winding.

29. The improvement according to claim 27, wherein the zero branches are combined so that their axes are displaced by $\pi/6$ relative to the base winding branches.

30. The improvement according to claim 1, wherein all winding coils are made, at least approximately, with a coil pitch for the pole pair number which is divisible by three, the coil pitch being approximately $\tau_2$ or an odd multiple thereof.

31. The improvement according to claim 1, wherein the winding coils are combined in concentric groups of coils.

32. The improvement according to claim 31 for a two layer winding with uniform slot filling, wherein the numbers of turns within each concentric group of coils are different.

33. The improvement according to claim 32, wherein the one half of the concentric coils is left out and the other half of the concentric coils made with twice the number of turns instead for forming a single layer winding.

34. The improvement according to claim 1, wherein said winding consists of two subwindings which are arranged in the slots side-by-side or on top of each other and/or are mutually displaced and/or are constructed in different ways, and the winding branches of which are each connected in series.

35. The improvement according to claim 34, wherein individual winding coils of the two subwindings are combined so as to obtain phase band overlapped two layer windings.

36. The improvement according to claim 1, wherein uniform slot shape is provided and wherein the zero branches are omitted and the slots normally used for said zero branches are occupied, at most in part, by coil sides of the base winding.

37. The improvement according to claim 1, wherein the zero branches are omitted and the shape of the slots is adapted with respect to their cross section that can be wound, to the coil side occupancy in each case.

38. The improvement according to claim 37, wherein the tooth width between respective adjacent slots is made at least approximately equal.

39. The improvement according to claim 1, wherein a secondary winding is provided for one of the two pole pair numbers, uniformly distributed, and is permanently connected to the corresponding connecting points of the pole changeable winding.

* * * * *